(12) United States Patent
Takayama et al.

(10) Patent No.: US 6,613,121 B2
(45) Date of Patent: Sep. 2, 2003

(54) SINTERED MATERIAL AND COMPOSITE SINTERED CONTACT COMPONENT

(75) Inventors: Takemori Takayama, Hirakata (JP); Yoshikiyo Tanaka, Hirakata (JP)

(73) Assignee: Komatsu Ltd. (JP)

( * ) Notice: Subject to any disclaimer, the term of this patent is extended or adjusted under 35 U.S.C. 154(b) by 0 days.

(21) Appl. No.: 09/883,299

(22) Filed: Jun. 19, 2001

(65) Prior Publication Data

US 2003/0049148 A1 Mar. 13, 2003

(51) Int. Cl.$^7$ ................................................. B22F 3/00
(52) U.S. Cl. ......................................... 75/247; 428/553
(58) Field of Search ............................. 75/247; 428/553

(56) References Cited

U.S. PATENT DOCUMENTS

| | | | | |
|---|---|---|---|---|
| 3,953,246 A | * | 4/1976 | Wilson et al. | |
| 4,365,996 A | * | 12/1982 | Melton et al. | 419/28 |
| 4,436,790 A | * | 3/1984 | Prinz et al. | 428/675 |
| 4,440,572 A | * | 4/1984 | Nadkarni et al. | 75/232 |
| 4,505,987 A | * | 3/1985 | Yamada et al. | 428/553 |
| 4,681,629 A | * | 7/1987 | Reinshagen | 75/246 |
| 5,925,837 A | * | 7/1999 | Ju et al. | 75/247 |
| 5,975,256 A | * | 11/1999 | Kondoh et al. | 188/251 M |

FOREIGN PATENT DOCUMENTS

| | | |
|---|---|---|
| JP | 56-152901 | 11/1981 |
| JP | 56-152902 | 11/1981 |
| JP | 57-94501 | 6/1982 |
| JP | 60-131903 | 7/1985 |
| JP | 05-156388 | 6/1993 |
| JP | 06-6725 | 1/1994 |
| JP | 07-188812 | 7/1995 |
| JP | 11-6021 | 1/1999 |

OTHER PUBLICATIONS

Mitani et al, "Revised and Enlarged Edition of Powder Metallurgy", pp. 79–82; pp. 258–260, Corona Publishing Co., Ltd. (Sep. 10, 1985).

"Powder and Power Metallurgy," vol. 29, No. 6, pp. 211–216 (1982).

* cited by examiner

Primary Examiner—Ngoclan Mai
(74) Attorney, Agent, or Firm—Rader, Fishman & Grauer PLLC

(57) ABSTRACT

There is provided a sintered material of which dimensional accuracy has been increased by improving the sinterability of Cu—Al based sintered material. More specifically, there are provided a sintered material and a composite sintered contact component, which are excellent in strength, wear resistance, seizure resistance and corrosion resistance. The sintered material is a Cu—Al based sintered material containing at least 1 to 12 wt % Sn and 2 to 14 wt % Al, and the composite sintered contact component is formed by sinter-bonding this sintered material to a metal backing.

27 Claims, 14 Drawing Sheets

FIG. 1  A GRAPH SHOWING THE EFFECT OF Al ADDED IN DIFFERENT FORMS UPON SINTERBILITY

FIG. 6 THE EFFECT OF VARIOUS ALLOY ELEMENTS UPON THE DIMENSIONS OF Cu-Al-1Ti SINTERED BODIES (1000°C2hr)

FIG. 10
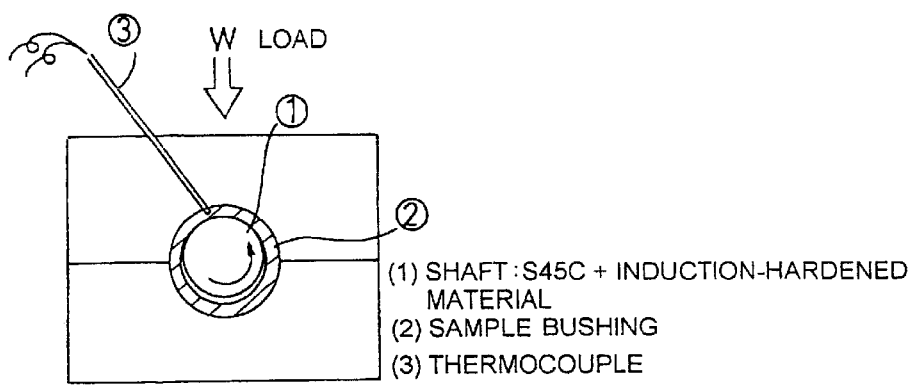
Fig. 10 (a)
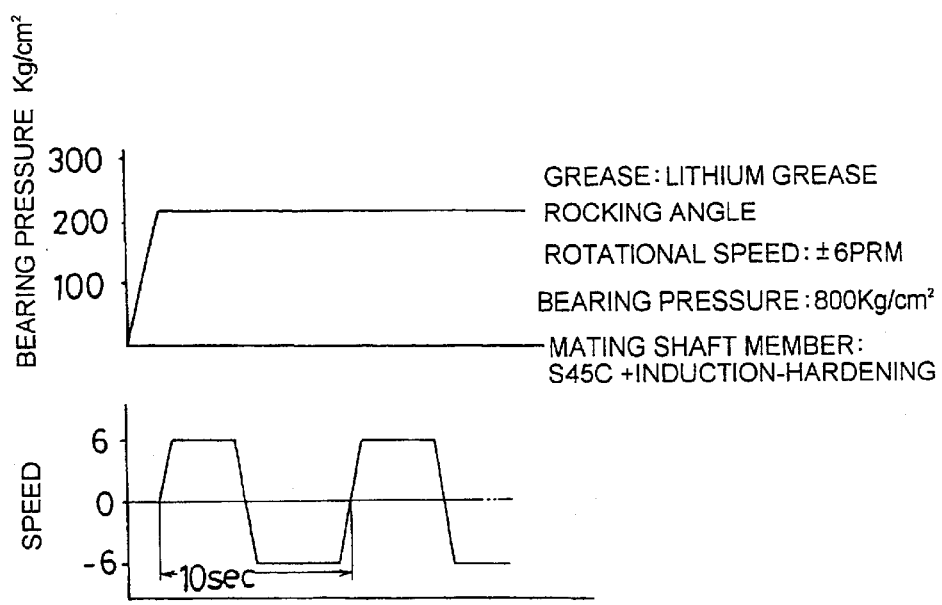
Fig. 10 (b)

THE RESULT OF A SLIDING TEST
CONDUCTED ON SINTERED BUSHINGS
THE INNER CIRCUMFERENTIAL PORTION
OF WHICH HAS BEEN SUBJECTED TO BONDING

FIG. 12
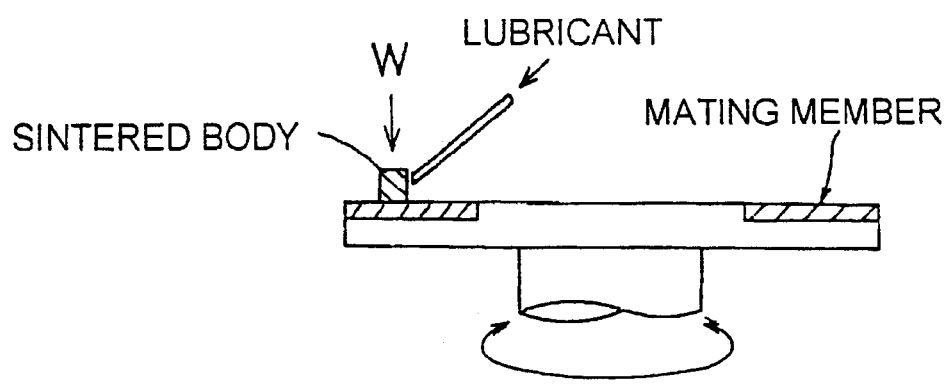
Fig. 12 (a)
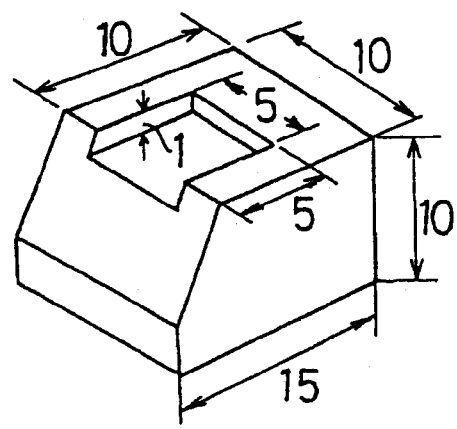
Fig. 12 (b)

FIG. 14
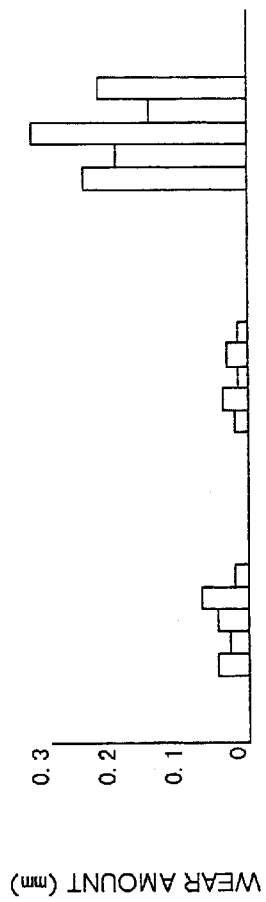
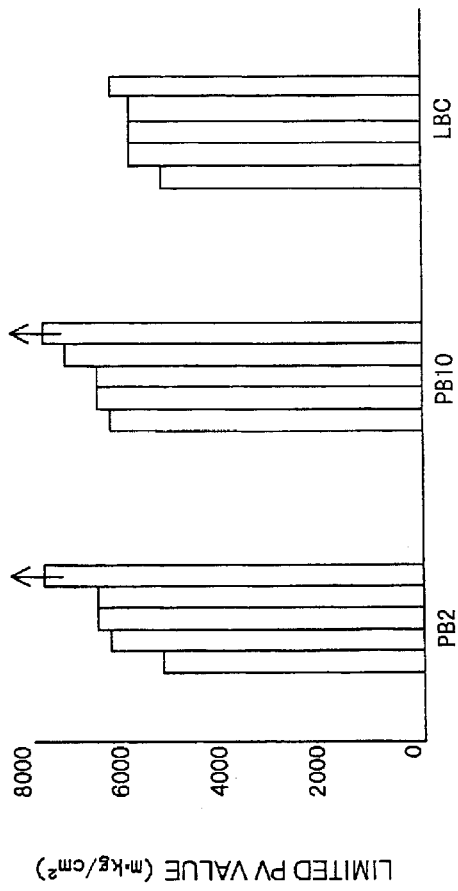

US 6,613,121 B2

SINTERED MATERIAL AND COMPOSITE SINTERED CONTACT COMPONENT

TECHNICAL FIELD

The present invention relates to a sintered material and a composite sintered contact component. More particularly, the present invention relates to a Cu—Al-based sintered material and a composite sintered contact component manufactured by use of the Cu—Al-based sintered material. The Cu—Al-based sintered material is obtained by increasing the sinterability of Al-bronze alloys widely used as copper alloys having excellent hardness, wear resistance, high-temperature oxidation resistance and corrosion resistance, and therefore is suited for use in manufacture of products with good dimensional accuracy.

BACKGROUND ART

Al-bronze alloys are widely used as copper alloys having high hardness, wear resistance, high-temperature oxidation resistance and corrosion resistance. However, when producing an Al-bronze alloy component from sintered material, abnormal expansion occurs during a sintering process, making it difficult to compress the material. For this reason, Al-bronze cast alloys and particularly, Cu—Al—Fe—Ni—Mn alloys are most commonly used and these alloys are stipulated as "AlBC1-4" by Japan Industrial Standard.

Related prior art is disclosed in Japanese Patent Publication (KOKAI) Gazette Nos. 56-152901 (1981) and 56-152902 (1981) according to which, 0.1 to 10 wt % Ti or 0.05 to 1.0 wt % P is added for the purpose of encouragement of sintering, thereby achieving Cu—Al-based sintered materials excellent in strength and toughness.

For example, bronze and lead-bronze based materials such as Cu—Sn—Pb are often used as copper-based sintered bearing materials, and double-layered sintered contact components in which one of such sintered materials is integral with an iron backing are well known. Such contact components are commonly used for the rollers incorporated in the base carrier of construction machines.

Also, steel bushings, to which carburization or induction hardening focused upon wear resistance has been applied, are commonly used in grease-lubricated circumstances as bearings (e.g., implement bushings for construction machines) used under higher bearing pressure and lower speed conditions. In particularly these implements, lubrication is getting worse under high bearing pressure, making an unpleasant abnormal noise in operation. Attempts to prevent abnormal noise have been made by use of high strength brass bushings or bushings made by further applying lubricant coating treatment to the above-described steel bushings.

An Al-bronze-based, double-layered, sintered contact component used in a high bearing pressure condition is disclosed in Japanese Patent Publication (KOKAI) Gazette No. 5-156388 (1993). According to this publication, an Al-bronze-based sintered alloy powder sheet, in which 3 to 8 wt % graphite (as a solid lubricating element), 5 to 13 wt % Al, 3 to 6 wt % Fe and 0.1 to 1.5 wt % Ti are dispersed, is bonded to a steel plate with a phosphor-bronze bonded layer therebetween, and at that time, pressure is applied during sintering at 800 to 950 degrees centigrade to provide high density for the Al-bronze-based sintered layer while firm bonding is ensured. In the sintered layer of the double-layered sintered contact component disclosed in the above publication, Ti is added in the form of hydrogenated Ti (TiH), while the $Al_2O_3$ coating of the Al powdery layer is reduced by hydrogen generated during sintering to increase sinterability. The sintered layer contains 18 to 25% by volume of voids and these voids are impregnated with a lubricant, thereby forming a contact component.

Al-bronze alloys widely used as high-strength, wear resistant copper-based alloys, however, have revealed the disadvantages that $Al_2O_3$ suspends during dissolution, causing poor fluidity and that they cause violent gas absorption, leading to a high coefficient of coagulation/contraction. For this reason, it is difficult to form sound cast products from Al-bronze alloys. Accordingly, a need exists for easy development of Al-bronze sintered alloys. However, as disclosed by Mitani et al. ("Revised and Enlarged Edition of Powder Metallurgy" pp. 79–82; pp. 258–260 issued by Corona Publishing Co., Ltd. (Sep. 10, 1985)), sound products having good compactness and dimensional accuracy cannot be produced from Cu—Al-based sintered materials since considerable expanding phenomenon emerges during sintering.

Hashimoto et. al. have reported an Al adding process in which compaction is carried out by sintering a Cu—Al-based alloy powder containing 6.54 wt % Al or 9.92 wt % Al at a high temperature of 1,000 degrees centigrade ("Powder and Powder Metallurgy", Vol. 29, No. 6, p. 211 (1982)). This process also suffers from the problem that an extremely strong degree of springback occurs when a compact particularly formed from a mixture of electrolytic Cu and alloy powder is taken out of a die with the result that the green compact is substantially broken.

In addition, as pointed out in the above report written by Mitani et. al., the techniques disclosed in the aforesaid Japanese Publication Nos. 56-152901, 56-152902, which use a mixed powder or alloy powder containing, as a master alloy powder, a sintered material having a high concentration of Al (6 to 9 wt %), is directed to avoiding eutectic reaction at a temperature of 548 degrees of centigrade shown in the Cu—Al phase diagram, but have revealed such a problem that tendency for the springback of the compact is high and the alloy powder is hard, which make it difficult to increase compact density. Especially, a higher degree of springback leads to damage to the compact when it is removed from the die, resulting in a considerable increase in the percentage of defective products.

It is conceivable that springback may be reduced by sintering a compact in which the sintered material structure is adjusted to consist of an alpha single phase region by use of the above-described Cu—Al alloy powder and by utilizing the sinter promoting action of Ti and P which occurs during sintering. However, where a compact formed from Al or an Al alloy powder is sintered, the eutectic reaction is involved in sintering so that the sinter promoting action of Ti and P cannot be utilized without arrangement and as a result, there arises a need for an addition of other elements as a third element and its effect has to be studied.

This is apparent from the fact that as disclosed in Japanese Patent Publication No. 5-156388, a Cu—Al-based sintered contact material, in which 0.1 to 1.5 wt % TiH is added to a powder blend containing a pure Al powder to improve sinterability, has 18 to 25% by volume of voids in heat-sintering at a pressure of 5 kg/cm$^2$ or less so that sufficient compactness cannot be achieved. Of course, the compactness of the sintered body can be achieved by applying increased pressure like the hot-press, but the application of increased pressure is disadvantageous in view of productivity as well as cost performance and, moreover, causes difficulty in producing sintered products of more intricate shape.

The double-layered sintered contact component of Japanese Patent Publication No. 5-156388 in which an Al bronze based sintered contact material containing 3 to 8 wt % graphite is integrally bonded to a metal backing with a phosphor bronze layer therebetween cannot avoid the increased cost of the sintering and/or sinter bonding process during which pressure is applied to cope with the above-described emergence of abnormal expansion during sintering. In addition, sinterability further decreases in the case of sintered metal bodies containing large amounts of solid lubricant such as graphite, and it is obvious that if high density and high hardness cannot be achieved in the sintered material, wear rapidly occurs in applications to implement bushings for construction machines which are subjected to use under an extremely high bearing pressure condition or a condition susceptible to a shortage of lubricant.

The Cu—Sn—Pb lead bronze based sintered contact materials, which are commonly used for manufacturing rollers of the base carrier of construction machines, contain large amount of Pb. Therefore, a need exists for development of alternative materials that can be used in place of Pb in order to cope with the environmental problems.

Where the above-described Al bronze based sintered contact material containing 3 to 8 wt % of graphite is used as an alternative material for Pb, another problem arises in which coefficient of friction increases because of graphite dispersion, increasing the likelihood of heat development when the resultant component is in sliding operation.

As an attempt to solve the above problem, high-strength brass alloys attract attention because they are unlikely to seize even when the lubricant runs out. They are, in fact, used in part of implement bushings for construction machines, but have not reached a point where satisfactory functions can be achieved.

In addition, the sintering of high-strength brass alloys with intention of improving the sliding function of the resultant component, has revealed the following problem. It is very difficult to form a high-density sintered material from high-strength brass alloys containing large amounts of Zn having extremely high vapor pressure. Since the concentration of Zn in the sintered material is likely to fluctuate and a slight fluctuation of Zn concentration causes a significant fluctuation in the (alpha+beta) dual phase structure (base structure) of high-strength brass. As a result, the beta phase cannot be controlled, the beta phase highly affecting wear resistance and slidability which provides insusceptibility to seizure at the time of a shortage of the lubricant.

The present invention is directed to overcoming the foregoing problems and a prime object of the invention is therefore to provide a sintered material with high dimensional accuracy by increasing the sinterability of Cu—Al-based sintered material and to provide sintered contact components as well as composite sintered contact components, these components being excellent in strength, wear resistance, seizure resistance and corrosion resistance and formed from the above sintered material.

Another object of the invention is to provide a sintered material having a sintered structure in which a beta phase having a harder phase in the Cu—Al phase diagram has emerged therein and in which intermetallic compounds are dispersed within an (alpha+beta) dual phase, the beta phase and the bases of the (alpha+beta) dual phase and beta phases, with intention of increasing the wear resistance of a bearing used under high bearing pressure and preventing abnormal noises, and to provide composite sintered contact components produced by sinter-bonding the above sintered material to a metal backing in an integral fashion.

The term, "beta phase" appearing in this specification is defined as a beta phase state at sintering temperature. It is well known that, as seen from Cu—Zn and Cu—Al phase diagrams, most of the constituents of the beta phase are martensite-transformed into a beta' phase when the sintered material has been cooled down to room temperature after sintering. Therefore, the meaning of the term "beta phase" herein includes the state of the beta' phase.

BRIEF SUMMARY OF THE INVENTION

The above objects can be achieved by a sintered material according to a first invention, which is a Cu—Al-based sintered material containing at least 1 to 12 wt % Sn and 2 to 14 wt % Al.

In the material of the first invention, the preferable relationship between the percentage of Al by weight and the percentage of Sn by weight is represented by:

$$18.5 \leq 2.5 \times (\text{Al wt \%}) + (\text{Sn wt \%}).$$

Preferably, the sintered material of the first invention contains one or more of Ti within the range of 0.3 to 5 wt % and Si within the range of 0.5 to 3 wt %. Preferably, the sintered material of the first invention has a structure in which a beta phase is present at least within a sintered structure and intermetallic compounds are dispersed within an (alpha+beta) dual phase, the beta phase and/or the bases of the (alpha+beta) dual phase and the beta phase. In addition, the sintered material preferably contains elements such as Mn, Ni and Fe in an amount of 5 wt % or less, these elements stabilizing the beta phase, retarding the eutectoid transformation of beta=alpha+gamma, and imparting hardness. The sintered material preferably contains 2 wt % or less of P in the form of phosphor-iron alloy powder, P functioning to increase reducibility in sintering. Preferably, the sintered material contains one or more alloy elements selected from the group consisting of P, Zn, Fe, Ni, Co, Mn, Be, Pb, Mo, W, Mg and Ag and/or one or more dispersion elements such as WC, graphite and ceramics.

The sintered material of the invention is suited for use in sliding parts.

The invention utilizes Sn and/or Si as an alloy element which prevents the expansion of Cu—Al-based sintered material or contracts Cu—Al-based sintered material, even when Al or an Al alloy powder, which has extremely low tendency for springback after compaction, is used as an Al source. Further, the use of Sn and/or Si in combination with other alloy elements such as Ti, Ni, Mn and phosphor iron makes it possible to produce a Cu—Al-based sintered material having excellent sinterability. The details will be described below.

(1) Compaction and Sintering Behaviors When Different Al Adding Conditions are Employed (a) Springback at the time of compaction was studied, using master alloy powders having an alpha or beta single phase and Al powders as an Al source. It was found from the study that where a beta single phase master alloy (13.9 wt % Al) was employed and a Cu—Al sintered material (mixed powder) containing 8 wt % Al was compacted at a pressure of 4 ton/cm$^2$, springback was 0.57% and there was the danger of damage to the compact during removal from the die. In contrast with this, where an Al powder was utilized, there was no fear of breakage of the compact due to springback and the addition of an Al powder was found to be favorable upon condition that the abnormal expansion after sintering can be restricted. Therefore, Cu—Al-based sintered materials containing Al or an Al alloy powder as an Al source have been developed in the invention.

Regarding the sinterability of compacts, the features as shown in FIG. 1 were found:

(b) The sinterability of sintered materials having an alpha single phase composition was checked at a temperature of 1,000 degrees centigrade using alpha and beta phase master alloys. It was found from the test that where an alpha single phase master alloy was used, contraction was admitted although its degree was small, whereas where a beta single phase master alloy was used, noticeable expansion was observed.

(c) Where a Cu—Al master alloy having a beta single phase and containing 14 wt % Al was used and an Al—Cu—TiH sintered material having an (alpha+beta) dual phase sintered structure and containing 8 wt % Al and 1 wt % TiH was tested, the sintered material exhibited higher expandability than that of the above material so that sintering of (alpha+beta) dual phase alloys was found to be difficult.

(d) The sintering behavior of sintered materials containing Al powder

It has been found that, regarding Cu—Al binary sintered materials, expansion proceeds substantially in proportion to the concentration of Al at a sintering temperature of 1,000 degrees centigrade or less, but when the temperature of sintering is 1,020 degrees centigrade which is close to the eutectic temperature (1,037 degrees centigrade) of Cu—Al binary alloys, alloys having a structure more similar to the eutectic composition (8.5 wt % Al) have better sinterability.

It will be understood from the above findings that while the expansion during sintering is difficult to be restricted where a Cu—Al alloy powder having high Al concentration is used as an Al source, the sinterability of materials having a structure similar to the eutectic composition can be promoted at sintering temperatures close to the eutectic temperature, although a transitional liquid phase is generated. Accordingly, in the invention, sinterability is increased by addition of alloy elements such as Sn and Si which generate a stable liquid phase on the lower temperature side.

(2) The Effect of Ti Addition Upon Sinterability

The effect when Ti was added to Cu—Al up to 3 wt % was checked. It was observed that although Ti did not promote sinterability nor contribute to the compaction of the sintered body at sintering temperatures of 1,000 degrees centigrade or less, Ti could achieve compaction at a sintering temperature of 1,020 degrees centigrade which was close to the eutectic temperature (1,038 degrees centigrade) of Cu—Al alloys. As discussed earlier, this is due to a decrease in the eutectic temperature caused by the addition of Ti, and the effect of the addition of Ti alone is limited to the particular temperature range, that is, temperatures just below the eutectic temperature of Al. Accordingly, it has been found that the sinterability of Cu—Al alloys can not be sufficiently improved by an addition of Ti alone.

(3) The Effect of Sn Addition Upon Sinterability

It has been found that a satisfactory sinter promoting effect cannot be obtained by an addition of TiH which actively reduces Al oxide films, but where a liquid phase is sufficiently involved, a satisfactory sinter promoting effect can be achieved although this effect is limited to the particular temperature range (temperatures immediately below the eutectic temperature of Al). Accordingly, the inventors have found from the following knowledge that Sn can be effectively used as the third alloy element for promoting the sinterability of Cu—Al alloys.

(a) Even if the oxide films formed on the Al particles function to impede sintering, diffusivity can be extremely increased, promoting sinterability and high compacting (contraction) action can be allowed to emerge, by controlling, with the third element, the sintering condition so as to promote liquid phase sintering.

(b) The third element markedly reduces the melting point of Cu, and it is preferable that the dual phase region where (alpha+liquid phases) coexist be wide and the solid soluble region for the alpha phase be wide.

(c) The third element is unlikely to form intermetallic compounds, reacting with the coexisting Al element.

(d) If the third element forms intermetallic compounds, reacting with the coexisting Al element, the melting point of the intermetallic compounds is lower than the sintering temperature.

The sinter promoting effect is admitted in sintering at 1,000 degrees centigrade with about no less than 5 wt % Sn and in sintering at 900 degrees centigrade with about 11 wt % Sn. The sinter promoting effect of Sn is remarkably enhanced by an addition of Ti. For instance, the sinter-contraction of Cu-10Al-3S-1Ti is admitted at 1,000 degrees centigrade and remarkably enhanced at 960 degrees centigrade with an addition of 3 wt % Ti.

The reason for this is as follows. A large amount of Sn can be dissolved within Cu (e.g., bronze), forming a solid solution. Further, Sn significantly decreases the melting point of Cu, lowers the (alpha+liquid phase) dual phase region to the lower temperature side, and concentrates within the liquid phase. In addition, as anticipated form the Hansen's phase diagram (Al—Sn binary alloys), Sn and Al are dissolved in each other, forming a solid solution only in a liquid phase but they repel each other strongly thermodynamically in both liquid phase and solid phase and do not create intermetallic compounds together. Therefore, part of the liquid phase constituents rich in Sn escapes from the sintered body as the compaction resulting from sintering proceeds. While a large amount of Sn is required for achieving the sinter promoting effect when Sn is added alone, the sweating phenomenon of the Sn-rich liquid phase constituents can be restricted by an addition of Ti so that the liquid phase which promotes sintering comes to exist in the sintered body. As a result, the promotion of sintering by Sn is significantly speeded up.

For restricting the sweating phenomenon, it is preferable to add a small amount of an element which and at least either Sn or Al thermodynamically attract each other. In view of this, Mn, Ni and phosphor iron (Fe-25 wt % P) were checked and verified that they had a function similar to that of Ti. Apart from these elements, the elements (e.g., Fe, Mo, Co, V, and Cr) which can form a noticeable amount of Al compounds and Sn compounds can be found from the Hansen's phase diagram.

As seen from the Hansen's phase diagram, the minimum amount of Sn necessary for the involvement of the liquid phase in sintering is 1 wt % or more when sintering temperature is close to 1,000 degrees centigrade and the amount of Sn is preferably limited to 12 wt % or less because the precipitation of brittle intermetallic compounds can be prevented with this.

Since the beta phase, which emerges in Cu—Al binary alloys owing to the addition of Sn, exists at the lower Al concentration side, it is preferable that the sintered material have, as its base, the (alpha+beta) dual phase structure including at least a beta phase, when used for producing a sintered contact component as described later. In this case, the amounts of Al and Sn are adjusted within the range described by the following relational expression. This should be taken into account in cases where the above-described elements (e.g., Ti) which form intermetallic compounds reacting with Al and Sn are added in large amounts.

$$18.5 \leq 2.5 \times (Al\ wt\ \%) + (Sn\ wt\ \%)$$

The preferable amount of Ti is 0.3 wt % or more because Ti is added with intention of restricting the sweating phenomenon as discussed earlier. If the amount of Ti exceeds 10 wt % or more, the amount of liquid phase constituents in sintering becomes excessive as seen from the Hansen's phase diagram. Accordingly, it is preferable to restrict the amount of Ti to 5 wt % or less for fear that the sweating phenomenon appears and hardening due to the precipitation of intermetallic compounds excessively occurs. This is also economically advantageous.

(4) The Effect of an Addition of Phosphor-iron Alloys Upon Sinterability

An addition of P in the form of a pure element powder is difficult and therefore P is generally added in the form of a master alloy powder. However, when adding P in the form of a master alloy powder, noticeable melt-off pores are created during sintering for instance in the case of a phosphor-copper alloy containing 8 wt % P and having a low melting point, which is undesirable for the compaction of the sintered body. In view of this, it is preferable to add P in the form of phosphor-iron alloys (e.g., Fe-25wt % P). The addition of P in the form of phosphor iron is advantageous for the following reasons: the above-described sweating phenomenon and the noticeable melt-off pores generally found in phosphor-copper alloys can be avoided; oxidation due to sintering atmosphere can be considerably restricted; and oxidation coloring (dark brown) of a sintered body can be prevented. These advantages apparently assign an added value to the resulting sintered product and are particularly useful for enhancing bonding when the sintered body is bonded to a metal backing during the sintering process. Further, where the present sintered material is used for a contact component, it is apparently effective to utilize the melt-off pores formed by adding a proper amount of phosphor-copper alloy powder if importance is attached to oil retaining ability. However, if the amount of phosphor-copper alloy exceeds 2 wt % in terms of the amount of P, there will be created excessive melt-off pores, resulting in unfavorable brittleness, and if the amount of phosphor-iron alloy exceeds 2 wt % in terms of the amount of P, the compaction achieved by sintering is disadvantageously impeded.

(5) The Effect of Si Addition Upon Sinterability

It is conceivable that an addition of Si enhances sinterability by its function similar to the function of Sn, since Si has substantially the same relationship with Al and Cu as Sn. For example, where Si is added to Cu—Al-1 wt % TiH, the sinter promoting effect of Si is noticeably admitted. However, if the amount of Si exceeds 3 wt %, noticeable hardness and brittleness are both observed. Accordingly, the amount of Si is preferably limited to 3 wt % or less.

It is well known that a combinational addition of Si and Mn can improve wear resistance particularly in a copper-based contact material. A combinational addition of Si and Mn is also preferable in the inventive sintered contact material.

(6) The Effect of Other Elements

An addition of Ni in combination with Al, Sn, Ti or Si is known to form strong intermetallic compounds, leading to increased hardness in a copper-based contact material. In addition, it is obvious that Ni functions together with Mn, Fe etc. to stabilize the beta phase of Cu—Al alloys, retard the eutectic transformation of beta=alpha+gamma and prevent emergence of the brittle (alpha+gamma) structure, for instance, during cooling subsequent to sintering. It is, therefore, favorable to positively add Ni, but its amount is preferably limited to 10 wt % or less and, more preferably, to 5 wt % or less in view of cost performance.

The function of Ni, which stabilizes the beta phase, reduces the amount of Al, leading to emergence of the beta phase so that sintering is facilitated. It is apparent from the Hansen's phase diagram that examples of elements which facilitate emergence of the beta phase in Cu alloys include Zn, Be, Ga, In, Sb, Si and Sn.

Further, Co, Be, Cr, Mg, Ag, Ti, Si and others are well known as elements which markedly affect the hardness of copper alloys and their positive use for the inventive sintered material has proved to be favorable.

Moreover, in the inventive sintered contact material, known materials such as W, Mo, tool steel atomized powders, SiC, $Si_4N_3$, Pb, graphite, MnS, PbS, TiS and various fluorides can be obviously, positively used as a hard dispersing agent or solid lubricant for the purpose of preventing seizure.

It is also apparent that the addition of the above elements such as Ti, Sn, Mn, Ni, Si, Co, Be, Cr, Fe, Mg, Ag, W, Mo, Pb and P can take the form of alloys or compounds in combination with Cu and other alloy elements.

According to the second invention, there is provided a composite sintered contact component formed by sinter-bonding a contact material excellent in hardness and wear resistance to a metal backing, the contact material being obtained, according to the first invention, by adding various alloy elements to a Cu—Al-based sintered material.

In short, the composite sintered contact component of the second invention is formed by integrally sinter-bonding a Cu—Al—Sn based sintered material to a metal backing, the Cu—Al—Sn based sintered material containing at least 1 to 12 wt % Sn and 2 to 14 wt % Al.

In a preferable form of the second invention, one or more of Ti within the range of 0.3 to 5 wt % and Si within the range of 0.5 to 3 wt % is added. Preferably, the second invention has a structure in which a beta phase is present at least within a sintered structure and intermetallic compounds are dispersed within an (alpha+beta) dual phase, the beta phase and/or the bases of the (alpha+beta) dual phase and beta phase. The second invention preferably contains elements such as Mn, Ni and Fe in an amount of 5 wt % or less, the elements stabilizing the beta phase, retarding the eutectic transformation of beta alpha+gamma and providing hardness. Further, a phosphor-iron alloy powder, which increases reducibility in sintering, is preferably added in an amount of 2 wt % or less in terms of P. Preferably, one or more alloy elements selected from the group consisting of P, Zn, Fe, Ni, Co, Mn, Be, Pb, Mo, W, Mg, and Ag and/or at least one of dispersing elements such as WC, graphite and ceramics is contained.

Sn contained in the Cu—Al—Sn based sintered contact material sweats as described earlier, so that Sn tends to segregate, existing on the contact surface of the resulting component during sliding operation. Accordingly, Sn has good seizure resistance as a contact material. It is preferable to add a small amount of an element (e.g., Ti and Ni) which controls the noticeable sweating of Sn to the Cu—Al—Sn based sintered contact material layer, thereby preventing porosity due to the sweating in the process of sintering. It is also preferable to add a hardening element such as Ti, Si, Mn and Ni thereby to adjust hardness and, in consequence, increase the wear resistance of the resulting contact material.

Further, the Cu—Al—Sn based sintered contact material has at least a beta phase in its structure. The beta phase is a hard phase having a vickers hardness of Hv 200 or more and superior to the alpha phase in terms of adhesion resistance. It is conceivable that when the material is cooled down to room temperature after sintering, most of the beta phase constituents are martensite-transformed into a beta' phase. However, the shape memory effect achieved by the martensitic transformation from the beta phase (untransformed phase) to the beta' phase as well as the reverse transformation from the beta' phase to the beta phase at the time of adhesion to the contact surface would prevent growth of damage caused by adhesion, since the martensitic transformation point (Ms point) is close to room temperature. Since this and the effect of improved tenacity would be expected, the inventive sintered contact material is structured to have the (alpha+beta) dual phase and the beta phase as a base, and intermetallic compounds composed of alloy elements such as Ti, Mn and Ni and alloy elements such as Al, Sn and Si are dispersed in the above structure in proper amounts. The term, "beta phase" appearing in the invention is defined as a beta phase state at sintering temperature. It is well known that, as discussed earlier, most of the constituents of the beta phase are martensite-transformed into the beta' phase when the sintered material has been cooled down to room temperature after sintering. Therefore, the meaning of the term "beta phase" in the invention includes the state of the beta' phase.

By virtue of the (alpha+beta) dual structure, the crystal grains of the sintered material become smaller so that uniform extension of the contact surface during adhesion/deformation is enhanced, whereas tenacity and adhesion resistance are increased by restricting abrupt hardening during the processing.

In this case, although it is anticipated that wear resistance decreases, while the removal of wear chip powder from the contact surface is improved, wear resistance can be increased by dispersion of the above-listed proper intermetallic compounds. It is known that the effect of the dispersion of the intermetallic compounds is observed when they are added in an amount of 0.2% by volume or more. Accordingly, in the invention, the lower limit of the precipitating amount of intermetallic compounds is preferably 0.2% by volume or more, whereas the upper limit depends on the application of the material (that is, which will be regarded as important among tenacity, adhesion resistance and wear resistance) and therefore cannot be particularly decided. Where the amount of the intermetallic compounds exceeds 35% by volume, the material often becomes brittle, so that the preferable upper limit is 35% by volume or less. Apparently, the precipitation of the intermetallic compounds in an amount of 0.2% by volume can be accomplished with an addition of about 0.1 wt % or more of the above elements. Therefore, the lower limit of the amount of the element added for the purpose of hardening is preferably controlled in consideration of the above value.

When utilizing the sintered contact material to form a contact component, the powder blend of the contact material is preferably compacted into a specified form and then sintered at a proper temperature for compaction. More preferably, the powder blend is formed into a plate-like shape and once sintered at a temperature of 800 degrees centigrade or more, thereby forming a sheet-like sintered body which is, in turn, mechanically compressed by rolling and then subjected to resintering. By carrying out this process at least once, a compact, hard sintered contact material can be easily produced. After being subjected to bending into a round shape, this sintered contact material is welded or clinched, and then machined into a final shape to form a bushing. The inventive Cu—Al—Sn based sintered material can be much more easily welded than hard high-strength brass-based contact materials, so that an extremely economical manufacturing method can be realized.

According to the invention, the above sheet-like compacted or sintered body is provided with a plurality of independent holes and processed into a round shape. Then, the rounded body is subjected to the same processing as in the above case, thereby forming a cylindrical bushing. These independent holes are utilized as storage holes for supplying various lubricants for lubrication. This process not only makes the oil replenishment intervals longer but also produces a sintered contact material with holes at much lower cost compared to cases where a cylindrical body is holed by machining.

There is known a method for manufacturing a composite sintered contact component in which after a sintered contact material has been sinter-bonded to a metal backing, bending into a round shape is carried out followed by welding or mechanical clinching, and then, the inner and outer faces of the material are machined (in the case of bushings). As discussed earlier, in the invention, the Cu—Al—Sn based sintered material is compressed by promoting sinterability by the addition of the various alloy elements at sintering temperatures of about 900 degrees centigrade or more. By utilizing the noticeable expandability at temperatures lower than the sintering temperature that enables compaction, the second invention is arranged such that: A cylindrical compact formed from the powder blend of the inventive sintered material is placed within the inner circumferential portion of a steel pipe used as a metal backing, the cylindrical compact having an outer diameter as large as or slightly smaller than the inner diameter of the steel pipe. After the cylindrical compact has been bonded to the inner circumferential surface of the metal backing at temperatures lower than the temperature range which provides compaction, the cylindrical compact bonded to the metal backing is compactedly sintered at temperatures of 900 degrees centigrade or more. With this process, a composite sintered contact component, in which the Cu—Al—Sn based sintered material is sinter-bonded to the inner circumferential surface of the metal backing, can be produced and, moreover, this composite sintered contact component can be economically manufactured without the conventionally utilized external pressure exerted from the bore portion.

To sum up, the second invention is designed such that a powder blend containing 2 to 14 wt % Al added in the form of Cu—Al based alloy powder or Al powder is compressed to form a desired cylindrical green compact which is, in turn, inserted into a metal backing having a bore slightly larger than the outer diameter of the green compact. Then, sinter-bonding is performed on the green compact at a temperature of 800 degrees centigrade or more in a sintering furnace controlled to have a vacuum, neutral or reduced atmosphere, whereby a composite sintered contact component in which the sintered material is bonded to the inner circumferential portion of the metal backing is produced.

Preferably, the sinter bonding of the green compact to the inner circumferential portion of the metal backing is carried out by use of a third metal alloy interposed between the metal backing and the green compact. In this case, the third metal alloy may consist of an ingot alloy and/or sintered alloy which create a liquid phase necessary for the bonding to the metal backing at least at the sinter-bonding temperature. The inner circumferential portion of the metal backing may be grooved such that the groove becomes an oil pool for lubricants after the sinter bonding. In addition, the metal backing may be steel.

According to the second invention, in cases where a bushing, which requires wear resistance and adhesion resistance as critical factors, is formed from the Cu—Al—Sn-based sintered material having a structure wherein an (alpha+beta) dual phase containing many hard beta constituents or a beta phase is created as a base and intermetallic compounds are dispersed, no cracking is caused by the above-described round shape bending in the sintered contact material.

As an alternative method for the above-discussed sinter bonding of the cylindrical green compact formed from the powder blend, the cylindrical composite sintered contact component can be manufactured by the following way: A sheet-like compact made from a powder blend is preliminarily sintered, rounded, and then sinter-bonded, being placed within the inner circumferential portion of the steel pipe.

At the time of compacting or after preliminary sintering, the sheet-like compact is provided with a plurality of independent holes which are utilized as storage holes for various lubricants so that lubrication is provided for the contact surface of the resulting cylindrical composite sintered contact component. Thanks to this arrangement, the composite sintered contact component has longer lubricant replenishment intervals.

As described above, a compact, hard sintered contact material can be produced by carrying out a process at least once, in which a sheet-like sintered body achieved by once sintering at 800 degrees centigrade or more is subjected to mechanical compaction by rolling and, then, subjected to resintering. This sintered contact material may be bent into a round shape, and then welded or clinched (i.e., geometrical bonded). With this process, the material can be easily shaped into e.g., a bushing. This process apparently presents the following advantages: (i) Materials (e.g., intermetallic compounds), which are poor in reactivity with respect to e.g., Cu and cannot be used in the form of an ingot, can be dispersed in the form of minute grains having sizes of 1 $\mu$m or less; and (ii) W, Mo, ceramics, tool steel powder, WC, hard metals, cement, solid lubricants and others can be dispersed.

The inventors have developed an integral, composite, sintered contact component by sinter-bonding a Cu—Al—Sn-based sintered contact material to a steel plate, based on such findings that excellent contact properties (e.g., tenacity during sliding movement, seizure resistance and wear resistance) equivalent to or superior to those of Pb-bronze-based sintered contact material can be achieved by the above described structure having the fine (alpha+beta) dual phase as a base. The inventive composite sintered contact component is particularly expected to play an increasingly important role in coping with the recent environmental problems as a Pb-free sintered contact component.

If the amount of elements such as Ti, Si, Ni, Mn and FeP which form compounds is increased, the resulting contact material becomes more likely to attack its mating member when it moves in sliding contact with the latter, and therefore, it is desirable to reduce the above elements as much as possible in the (alpha+beta) dual phase structure of the Cu—Al—Sn based composite sintered contact component.

The Cu—Al—Sn based composite sintered contact component sinter-bonded to the steel plate may be formed such that after the powder blend has been compressed (e.g., by rolling), the compressed body is sintered at least twice at 700 degrees centigrade or more in a furnace controlled to have a vacuum, neutral, or reduced atmosphere, whereby the difficulty of sintering the Cu—Al based sintered material due to the formation of an oxidized film is overcome by oxidized film destruction caused by compression molding, so that a highly tough sintered material can be obtained even by low-temperature sintering, which sintered material is a Pb-free contact material hardly attacking its mating material and having the fine (alpha+beta) dual phase structure as a base.

More concretely, the powder blend of Cu—Al—Sn based sintered contact material composed of at least a bronze powder, copper powder, Sn powder, Al powder and TiH powder is sprayed onto the steel plate, and sinter-bonding is carried out at 700 degrees centigrade or more in a sintering furnace controlled to have a vacuum, neutral or reduced atmosphere. Then, compression molding (e.g., rolling) and the above-described sintering process at 700 degrees centigrade in the same sintering atmosphere are preferably repeated twice or more, thereby obtaining a Cu—Al—Sn composite sintered contact component. It is desirable to use an atomized powder particularly in view of scatterablility. For achieving more uniform bonding, a bronze atomized powder needs to be used properly. In addition, the amount of Sn contained in the Cu—Al—Sn based sintered contact material is preferably 3 wt % or more in order to ensure good bonding with respect to the steel plate, whereas the amount of Al is controlled in consideration of the quantitative relationship between the alpha phase and the beta phase. For example, in the case of Cu—Al—Sn—Ti ternary alloys containing 3 wt % Sn and 1 wt % Ti, the (alpha+beta) dual phase is created where the amount of Al is 10 wt %, but where the amount of Al is about 12 wt % or more, the material has a single beta phase and therefore excessive hardness, resulting in poor tenacity. Therefore, the amount of Al should not exceed about 12 wt %.

It is desirable to lessen the amount of Al while increasing the amount of Sn in order to ensure stable bonding with respect to the steel plate, but the amount of Sn needs to be reduced in view of the cost performance of the Cu—Al—Sn based sintered contact material.

Taking the above into account, the invention is characterized by the following process: A bronze-based, Cu—Sn alloy powder or powder blend containing 5 to 12 wt % Sn is sprayed onto a steel plate; and then the alloy powder or powder blend is sinter-bonded to the steel plate at 700 degrees centigrade or more in a sintering furnace controlled to have a vacuum, neutral or reduced atmosphere to form a metal backing. The above-described Cu—Al and/or Cu—Al—Sn based alloy powder having an Al concentration of 2 to 14 wt % is sprayed onto the metal backing. Then, the steps of (i) sintering and rolling at 700 degrees centigrade or more; (ii) sintering or rolling at 700 degrees centigrade or more; and (iii) sintering at 700 degrees centigrade or more are carried out thereby obtaining the composite sintered contact component.

Herein, it is preferable to further repeat, twice or more, the steps of (i) sintering and rolling at 700 degrees centigrade or more; (ii) sintering or rolling at 700 degrees centigrade or more; and (iii) sintering at 700 degrees centigrade or more, whereby the Cu—Al and/or Cu—Al—Sn based sintered contact layer is fined so as to have an average grain size of 5 μor less and, at the same time, compacted so as to have a relative density of 90% or more.

In addition, the fining of the crystal grains of the Cu—Al—Sn based sintered material can be accomplished by: (i) restraining the growth of the grains owing to the dual phase structure during sintering; (ii) sintering at low temperatures carried out by the above-described repetition of compression/sintering and fining by recrystallization; and (iii) the addition of the elements (e.g., Ti, Si, Ni) which are likely to form compounds. It should be noted that when sintering temperature is 700 degrees centigrade or less, alloying reaction becomes slow and sufficient deformation cannot be ensured in the compression process, resulting in cracks within the sintered body, even though a liquid phase is generated. Therefore, desirable sintering temperature is 800 degrees centigrade or more.

BRIEF DESCRIPTION OF THE DRAWINGS

FIG. 10(a) is a conceptual view of a tester.

FIG. 10(b) is a view showing test conditions.

FIG. 12(a) is a conceptual view of a constant-rate friction/wear tester.

FIG. 12(b) is a view of a sliding tester holder.

FIG. 14(a) graphically shows the amount of wear for evaluation of tenacity.

FIG. 14(b) graphically shows the result of a PV value reproducibility test.

DETAILED SUMMARY OF THE INVENTION

Figure 1:
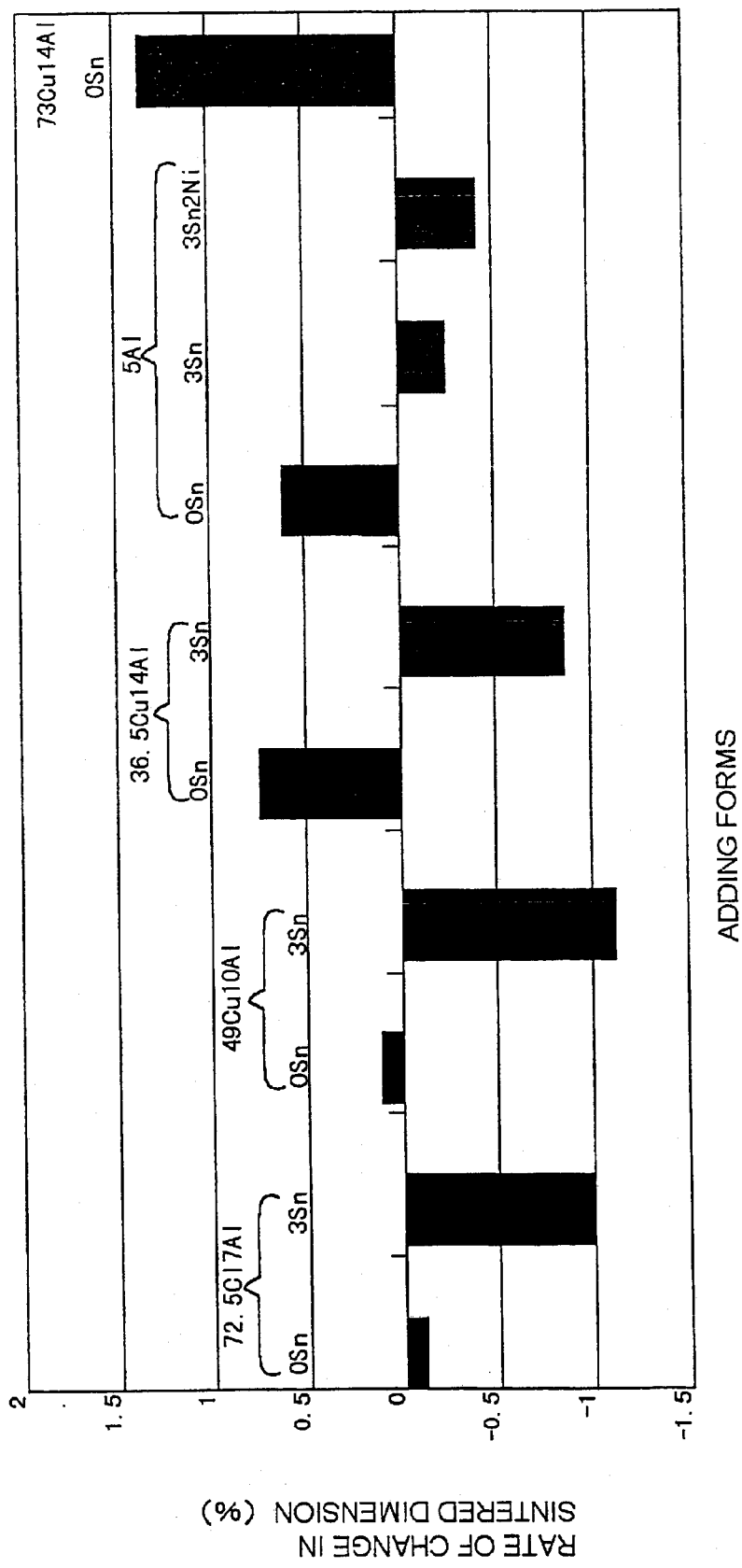
FIG. 1 graphically shows the effect of Al added in different forms upon sinterability.

Referring now to the accompanying drawings, preferred embodiments of the sintered material and composite sintered contact component of the invention will be hereinafter concretely described.

EMBODIMENT 1

The Effects of Al Addition and Sn Addition upon Compactibility and Sinterability Cu—Al atomized alloy powders having a grain size of 250 meshes or less and containing Al in amounts of 6.9, 10.2, and 13.7 wt % respectively; and Al atomized powder; an Sn atomized powder; a TiH powder; and an electrolytic copper powder ("CE15" produced by Fukuda Metal Foil & Powder Co., Ltd.) were used to prepare powder blends having the compositions shown in TABLE1. Note that the Al atomized powder, Sn atomized powder, and TiH powder and a grain size of 300 meshes of less. The powder blends were compacted at a pressure of tons/cm$^2$ with a die for tensile tests specified by JIS. The dimension (length) of each tensile test sample was measure. TABLE 1 shows the dimension and degree of springback of each sample.

TABLE 1

THE DIMENSIONS OF COMPACTS, DEGREES OF SPRINGBACK (%), AND THE DIMENSIONS OF SINTERED BODIES (mm) WHEN Al IS ADDED IN DIFFERENT FORMS

| No | Cu*) | Cu6.9Al | Cu10.2Al | Cu13.7Al | Al | Sn | TiH | DIMENSIONS OF COMPACTS 4 ton/cm$^2$ | DEGREES OF SPRINGBACK**) |
|---|---|---|---|---|---|---|---|---|---|
| CA1 | Bal. | 72.5 | | | | 0 | 1 | 96.63 | 0.08 |
| CA2 | Bal. | 72.5 | | | | 3 | 1 | 96.61 | 0.06 |
| CA3 | Bal. | | 49 | | | 0 | 1 | 96.71 | 0.17 |
| CA4 | Bal. | | 49 | | | 3 | 1 | 96.71 | 0.17 |
| CA5 | Bal. | | | 36.5 | | 0 | 1 | 96.84 | 0.30 |
| CA6 | Bal. | | | 36.5 | | 3 | 1 | 96.81 | 0.27 |
| CA7 | Bal. | | | | 5 | 0 | 1 | 96.56 | 0.01 |
| CA8 | Bal. | | | | 5 | 3 | 1 | 96.57 | 0.02 |
| CA9 | Bal. | | | | 5 | 3 | 1 | 96.57 | 0.02 |
| CA10 | Bal. | | | 73 | | 0 | 1 | 97.1 | 0.57 |
| CA11 | Bal. | | | 73 | | 3 | 1 | 97.07 | 0.54 |

TABLE 1-continued

THE DIMENSIONS OF COMPACTS, DEGREES OF SPRINGBACK (%), AND THE DIMENSIONS OF SINTERED BODIES (mm) WHEN A1 IS ADDED IN DIFFERENT FORMS

| No | DIMENSIONS OF SINTERED BODIES 820° C. 5 min. | DIMENSIONS OF SINTERED BODIES 900° C. 5 min. | DIMENSIONS OF SINTERED BODIES 1020° C. (4 ton) 1 hr | MARGIN FOR CONTRACTION |
|---|---|---|---|---|
| CA1 | 96.76 | 96.71 | 96.53 | −0.10% |
| CA2 | 97.32 | 97.33 | 95.64 | −1.00% |
| CA3 | 97.1 | 97.02 | 96.81 | 0.10% |
| CA4 | 97.68 | 97.64 | 95.65 | −1.10% |
| CA5 | 97.85 | 97.63(5) | 97.52 | 0.70% |
| CA6 | 98.16 | 97.97(5) | 95.99 | −0.85% |
| CA7 | 97.55 | 97.55(5) | 97.17 | 0.63% |
| CA8 | 98.32 | 98.39(6) | 96.39 | −0.19% |
| CA9 | 98.17 | 98.28(5) | 96.13 | −0.46% |
| CA10 | 98.33(5) | 98.69 | 98.44 | 1.38% |
| CA11 | 98.55(5) | 99.01 | | Melt Down |

*)CE15
**)BASED ON 96.55

It will be understood from the result that when powder blends containing a Cu—Al alloy powder as an Al source were compacted, a significant degree of springback was admitted and that there was a high risk of damage to the resulting compacts caused when they were removed from the die after compaction, particularly in cases where the powder blends contained a beta phase or a beta phase powder having a high concentration of Al. The degree of springback was especially noticeable, reaching as much as 0.57% in the case of Sample No. CA10 shown in TABLE 1, in which a Cu—Al sintered alloy containing 10 wt % Al was obtained by use of a beta-phase Cu—Al alloy powder containing 13.7 wt % Al. As understood from this, when a Cu—Al sintered body having an (alpha+beta) dual phase or beta phase structure and a high concentration of Al is formed from alloy powder, it is substantially impossible to employ press molding with dies and it is therefore suitable to use soft Al and Al alloy powder such as shown in TABLE 1.

There are shown in TABLE 1 the dimensions of sintered bodies, which were obtained by sintering tensile test samples compacted using the powder blends shown in TABLE 1 in a vacuum sintering furnace (degree of vacuum= about $10^{-2}$ torr; sintering temperature=900 degrees centigrade and 1,020 degrees centigrade). It is understood from the comparison between Sample Nos. CA1, CA3, CA5 and CA7 in TABLE 1, these samples having an Al concentration of 5 wt % that the higher the Al concentration of an Al source is, the greater the expanded dimension of the resultant sintered body is, even when sintering temperature is 1,020 degrees centigrade. In addition, in order to restrain the expansion, it is necessary to use an alpha-phase Cu—Al alloy powder having a low concentration of Al and limit the Al concentration of the sintered body, for example, to 5.6% or less.

When the effect of an addition of 3 wt % Sn (with the coexistence of 1 wt % Ti) was checked in Sample Nos. CA2, CA4, CA6, CA8 and CA11, it was found that an addition of 3 wt % Sn lead to considerable expansion in the dimensions of the sintered bodies in low-temperature sintering at 900 degrees centigrade and lead, on the contrary, to contraction at 1,020 degrees centigrade, irrespective of different Al adding conditions. Accordingly, it would be understood that addition of Sn is very useful for restraining expansion caused by sintering in Cu—Al sintered bodies, and Cu—Al based sintered products free from abnormal expansion can be obtained with the conventional press molding technique by employing, as an Al source, Al or Al alloy having little tendency for springback.

EMBODIMENT 2

The Effects of Additions of Various Alloy Elements Upon Cu—Al Alloys Containing Al Powder as an Al Source In addition to the electrolytic copper powder, Sn powder, TiH powder and Al powder used in Embodiment 1, an Mn powder, Ni powder, phosphor iron (P: 25 wt %) and Si powder were used to prepare powder blends having the compositions shown in TABLE 2. Note that the Mn powder, Ni powder, phosphor iron and Si powder had a grain size of 300 meshes or less. With the same tensile test die as used in Embodiment 1, tensile test samples, which had been compacted at a pressure of 4 ton/cm$^2$, were sintered in a vacuum ($10^{-2}$ torr) at 800 to 1,020 degrees centigrade. After the sintering, the dimensions of the sintered bodies were measured and their structures were observed. The dimensions of the sintered bodies are shown in TABLE 2, whereas the dimension of the compacts is 96.56 mm.

TABLE 2

THE COMPOSITIONS OF VARIOUS POWDER BLENDS AND SINTERED DIMENSIONS WHERE Al POWDER IS ADDED

| No | Cu (CE15) | Al | Sn | Ti | Si | Mn | Ni | Fe27P | Cu8P | 1020° C. 2 hr (mm) | 1000° C. 20 min DIMENSION |
|---|---|---|---|---|---|---|---|---|---|---|---|
| 1 | Bal. | 7 | 0 | | | | | | | 97.97 | 98.1 |
| 2 | Bal. | 9 | 0 | | | | | | | 97.51 | 98.54 |
| 3 | Bal. | 10 | 0 | | | | | | | 98.02 | 98.81 |
| 4 | Bal. | 11 | 0 | | | | | | | 98.42 | 98.93 |
| 5 | Bal. | 10 | 3 | | | | | | | | 98.56 |
| 6 | Bal. | 10 | 6 | | | | | | | | 92.46 |
| 7 | Bal. | 10 | 9 | | | | | | | | 89.9 |
| 8 | Bal. | 4 | 6 | | | | | | | | 94.48 |
| 9 | Bal. | 5 | 6 | | | | | | | | 93.3 |
| 10 | Bal. | 6 | 6 | | | | | | | | 91.27 |
| 11 | Bal. | 7 | 6 | | | | | | | | 88.09 |
| 12 | Bal. | 8 | 6 | | | | | | | | 89.33 |
| 13 | Bal. | 2 | 11 | | | | | | | | |
| 14 | Bal. | 3 | 11 | | | | | | | | |
| 15 | Bal. | 4 | 11 | | | | | | | | |
| 16 | Bal. | 5 | 11 | | | | | | | | |
| 17 | Bal. | 6 | 11 | | | | | | | | |
| 18 | Bal. | 7 | | 1 | | | | | | 98.23 | 98.14 |
| 19 | Bal. | 8 | | 1 | | | | | | 97.35 | 98.45 |
| 20 | Bal. | 9 | | 1 | | | | | | 96.91 | 98.71 |
| 21 | Bal. | 10 | | 1 | | | | | | 97.88 | 99.09 |
| 22 | Bal. | 11 | | 1 | | | | | | 98.91 | 99.45 |
| 23 | Bal. | 12 | | 1 | | | | | | 98.68 | 99.84 |
| 24 | Bal. | 14 | | 1 | | | | | | 99.3 | 100.8 |
| 25 | Bal. | 7 | | 3 | | | | | | 96.38 | 97.34 |
| 26 | Bal. | 9 | | 3 | | | | | | 94.26 | 98.01 |
| 27 | Bal. | 11 | | 3 | | | | | | 95.03 | 98.78 |
| 28 | Bal. | 7 | 3 | 1 | | | | | | 97.68 | 96.53 |
| 29 | Bal. | 9 | 3 | 1 | | | | | | 97.53 | 96.17 |
| 30 | Bal. | 11 | 3 | 1 | | | | | | 97.76 | 96.74 |
| 31 | Bal. | 10 | 3 | 3 | | | | | | | 94.13 |
| 32 | Bal. | 10 | 6 | 3 | | | | | | | 92.29 |
| 33 | Bal. | 7 | | 1 | 2 | | | | | 95.88 | 93.21 |
| 34 | Bal. | 9 | | 1 | 2 | | | | | 96.46 | 92.99 |
| 35 | Bal. | 11 | | 1 | 2 | | | | | 98.06 | 95.24 |
| 36 | Bal. | 10 | 3 | 1 | 1 | | | | | | 98.34 |
| 37 | Bal. | 10 | 6 | 1 | 1 | | | | | | 98.66 |
| 38 | Bal. | 7 | | 1 | | 3 | | | | 98 | 99.15 |
| 39 | Bal. | 9 | | 1 | | 3 | | | | 97.19 | 98.27 |
| 40 | Bal. | 11 | | 1 | | 3 | | | | 98.17 | 98.96 |
| 41 | Bal. | 10 | 3 | 1 | | 3 | | | | | 97.74 |
| 42 | Bal. | 10 | 6 | 1 | | 3 | | | | | 98.06 |
| 43 | Bal. | 7 | | 1 | | | 4 | | | 98.06 | 98.12 |
| 44 | Bal. | 9 | | 1 | | | 4 | | | 98.44 | 98.69 |
| 45 | Bal. | 11 | | 1 | | | 4 | | | 99.01 | 99.44 |
| 46 | Bal. | 10 | 3 | 1 | | | 3 | | | | 96.89 |
| 47 | Bal. | 10 | 6 | 1 | | | 3 | | | | 97.37 |
| 48 | Bal. | 7 | | 1 | | | | 4 | | 96.89 | 97.25 |
| 49 | Bal. | 9 | | 1 | | | | 4 | | 96.67 | 97.8 |
| 50 | Bal. | 11 | | 1 | | | | 4 | | 97.87 | 98.37 |
| 51 | Bal. | 10 | 3 | 1 | | | | 3 | | | 96.76 |
| 52 | Bal. | 10 | 6 | 1 | | | | 3 | | | 94.34 |
| 53 | Bal. | 10 | 3 | 1 | | | | | 10 | | 97.78 |
| 54 | Bal. | 10 | 6 | 1 | | | | | 10 | | 98.15 |
| CA7 | Bal. | 5 | 0 | 1 | | | | | | 97.17 | |
| CA8 | Bal. | 5 | 3 | 1 | | | | | | 96.39 | |
| CA9 | Bal. | 5 | 3 | 1 | 2 | | | | | 96.13 | |

| No | 960° C. 20 min DIMENSION | 930° C. 20 min DIMENSION | 900° C. 20 min DIMENSION | 850° C. 20 min DIMENSION | 820° C. 20 min DIMENSION |
|---|---|---|---|---|---|
| 1 | 98.15 | 98.2 | 98.26 | 97.83 | 97.99 |
| 2 | 98.7 | 98.75 | 98.83 | 98.2 | 98.56 |
| 3 | 99 | 99 | 99.05 | 98.43 | 98.87 |
| 4 | 99.31 | 99.36 | 99.41 | 98.57 | 99.12 |
| 5 | 99.73 | 99.68 | 99.86 | 99.95 | 100.07 |
| 6 | 99.38 | 99.77 | 100.36 | 100.77 | 100.76 |
| 7 | 97.27 | 99.37 | 100.8 | 101.11 | 101.23 |
| 8 | 98.65 | 99.06 | 99.24 | 99.31 | 98.91 |
| 9 | 97.99 | 98.83 | 99.2 | 99.23 | 99.04 |
| 10 | 97.14 | 98.68 | 99.2 | 99.32 | 99.21 |

TABLE 2-continued

THE COMPOSITIONS OF VARIOUS POWDER BLENDS AND
SINTERED DIMENSIONS WHERE Al POWDER IS ADDED

| | | | | | |
|---|---|---|---|---|---|
| 11 | 98.07 | 99.15 | 99.4 | 99.6 | 99.46 |
| 12 | 98.57 | 99.46 | 99.62 | 99.9 | 99.59 |
| 13 | 94.44 | 96.62 | 98.79 | 98.8 | 99.42 |
| 14 | 93.36 | 96 | 98.32 | 98.83 | 99.53 |
| 15 | 92.59 | 95.27 | 98.02 | 98.75 | 99.51 |
| 16 | 91.73 | 94.97 | 98.58 | 99.85 | 99.8 |
| 17 | 91.78 | 97.06 | 99.55 | 100.34 | |
| 18 | | | 98.11 | | |
| 19 | | | 98.45 | | |
| 20 | | | 98.64 | | |
| 21 | | | 98.88 | | |
| 22 | | | 99.42 | | |
| 23 | | | 99.65 | | |
| 24 | | | 100.68 | | |
| 25 | | | 97.66 | | |
| 26 | | | 98.27 | | |
| 27 | | | 99.13 | | |
| 28 | | | 98.82 | | |
| 29 | | | 98.98 | | |
| 30 | | | 100 | | |
| 31 | 95.01 | 98.92 | 99.54 | 99.2 | 99.45 |
| 32 | 93.56 | 99.34 | 100.48 | 100.17 | 100.37 |
| 33 | | | 98.37 | | |
| 34 | | | 99.11 | | |
| 35 | | | 100.36 | | |
| 36 | 99.46 | 100.27 | 100.86 | 100.2 | 100.64 |
| 37 | 97.94 | 98.05 | 100.43 | 101.48 | 101.7 |
| 38 | | | 98.03 | | |
| 39 | | | 98.41 | | |
| 40 | | | 99.2 | | |
| 41 | 97.58 | 99.36 | 99.7 | 99.17 | 99.34 |
| 42 | 97.8 | 97.53 | 99.08 | 99.97 | 100.22 |
| 43 | | | 97.94 | | |
| 44 | | | 98.59 | | |
| 45 | | | 99.19 | | |
| 46 | 99.58 | 99.66 | 99.82 | 99.68 | 99.64 |
| 47 | 96.5 | 98.94 | 100.22 | 100.43 | 100.37 |
| 48 | | | 98.25 | | |
| 49 | | | 98.84 | | |
| 50 | | | 99.31 | | |
| 51 | 99.71 | 99.95 | 100.07 | 99.96 | 100.04 |
| 52 | 98.16 | 99.31 | 100.44 | 100.99 | 101.2 |
| 53 | | | | | |
| 54 | | | | | |
| CA7 | | | 97.55 | | 97.55 |
| CA8 | | | 98.39 | | 98.32 |
| CA9 | | | 98.28 | | 98.17 |

(1) The Effect of Sn Addition Upon Cu—Al Based Sintered Material

Figure 2:
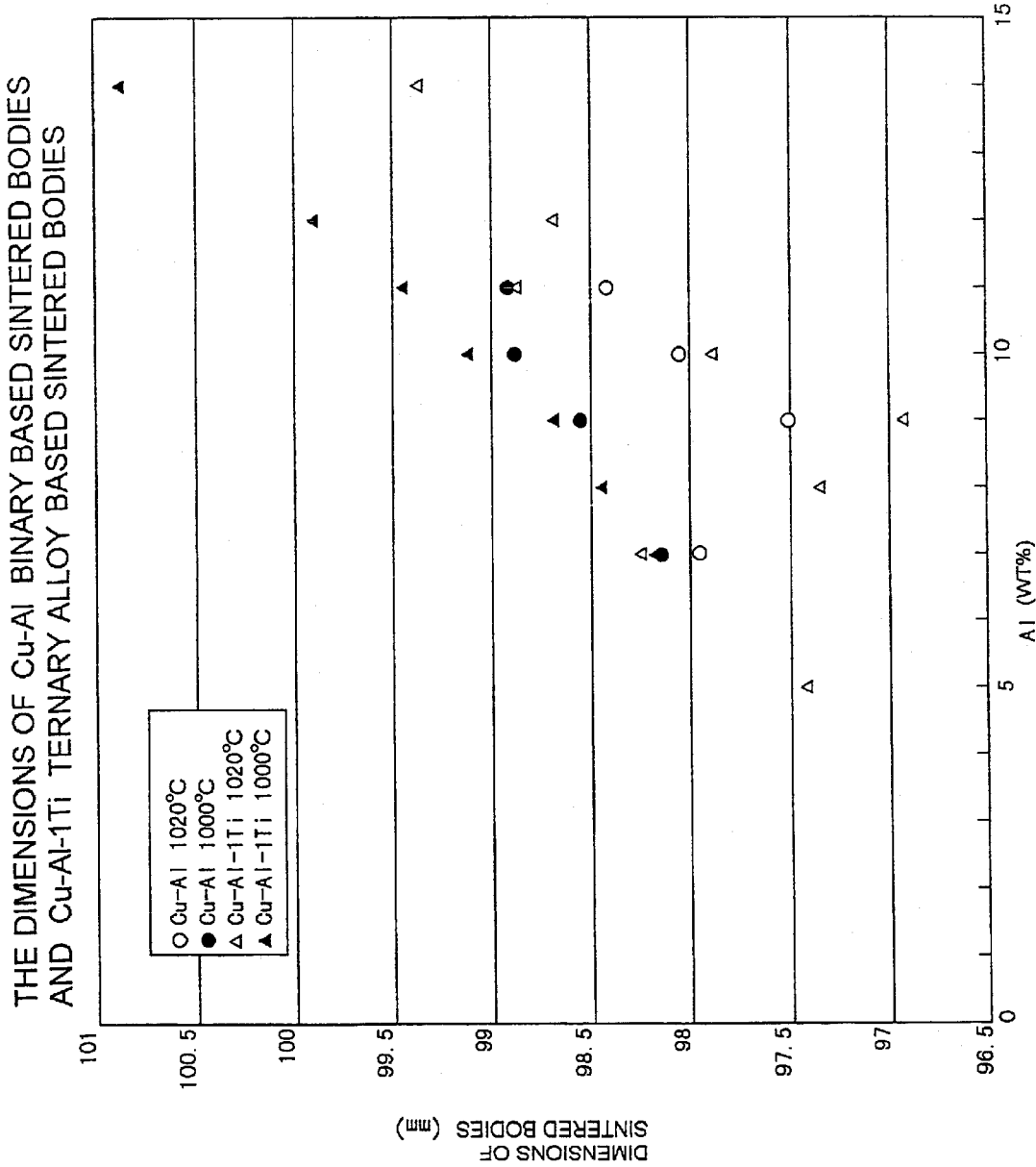
FIG. 2 graphically shows the dimensions of Cu—Al binary alloy based sintered bodies and Cu—Al-1Ti ternary alloy based sintered bodies.

Sample Nos. 1 to 17 in TABLE 2 respectively show the dimensions of sintered bodies obtained when Sn was not added to Cu—Al and when Sn was added to Cu—Al. FIG. 2 shows the dimensions of sintered bodies formed from Cu—Al binary alloys (Sample Nos. 1 to 4) in a comparison of sintered bodies formed from Cu—Al—Ti ternary alloys containing 1 wt % Ti (Sample No. 18 to 24) described later.

As apparent from TABLE 2 and FIG. 2, while all the sintered bodies were expanded in proportion to Al concentration at 1,000 degrees centigrade, a decrease in the amount of expansion was admitted in the sintered bodies formed by sintering materials at 1,020 degrees centigrade which was just below the eutectic temperature in the Cu—Al binary alloy phase diagram, the materials having a structure similar to the eutectic composition in the above phase diagram. Apparently, this is due to a sintering phenomenon likely to cause a transitional liquid phase at temperatures just below the eutectic point.

Referring to TABLE 2 in conjunction with FIG. 2 which shows the dimensions of Cu—Al sintered bodies, the effect of Sn addition will be described. While contraction could not be observed with an addition of 3 wt % Sn, noticeable contraction was admitted at 1,000 degrees centigrade, 960 degrees centigrade and 930 degrees centigrade when 6 wt % Sn and 11 wt % Sn were respectively added. Accordingly, it is apparent that sinterability could be improved by the liquid phase caused by an addition of Sn. However, the sintered bodies to which Sn was added alone often sweated considerably and became porous. Sample Nos. 5, 6 exhibited insignificant sintering contraction at 1,000 degrees centigrade because the liquid phase was discharged from the sintered body owing to the sweating phenomenon so that the liquid phase required for contraction run out. The sweating phenomenon of the liquid phase can be restricted by addition of other elements for improved sinterability.

Figure 3:
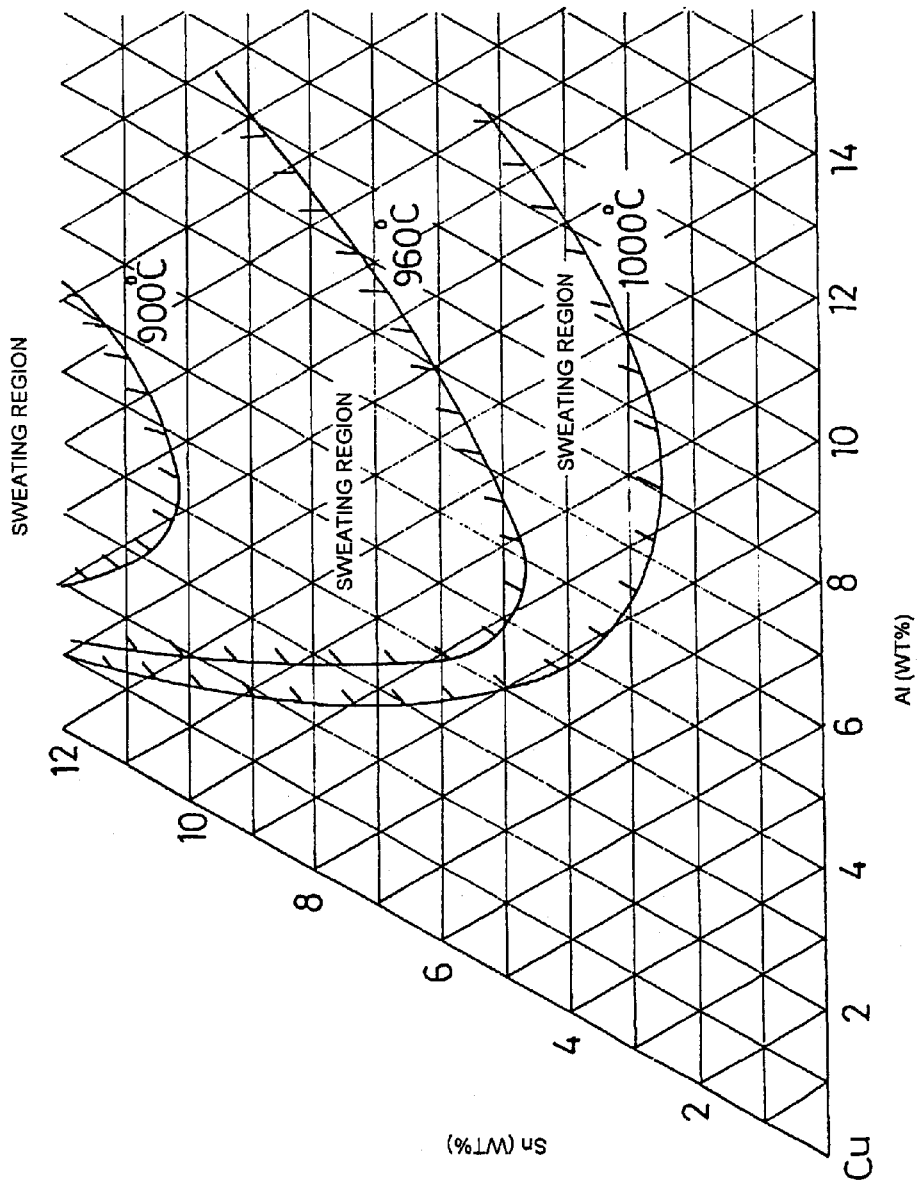
FIG. 3 graphically shows sintering temperatures and the sweating composition regions of the Cu—Al—Sn ternary alloy based sintered bodies.

FIG. 3 shows the regions in the structures of Cu—Al—Sn ternary alloy sintered bodies (Sample Nos. 5 to 17 in TABLE 2) in which the sweating phenomenon was admitted during vacuum sintering at temperatures of 1,000 degrees centigrade, 960 degrees centigrade and 900 degrees centigrade. As seen from FIG. 3, no sweating appeared at 850 degrees centigrade or less.

To further clarify the effect of Ti upon the sweating phenomenon due to Sn, the emergence/unemergence of the sweating phenomenon was checked when sintering, at 1,000 degrees centigrade, Sample Nos. 5 to 17 (TABLE 2) to which 0.3 wt % Ti had been added and when sintering, at 930 degrees centigrade, Sample Nos. 13 to 17 to which 0.3 wt % Ti had been added. As a result, sweating was found to be restricted in other samples than Sample No. 7 which was sintered at 1,000 degrees centigrade and sweated slightly.

(2) The Effect of Ti Addition Upon Cu—Al Based Sintered Material

Figure 4:
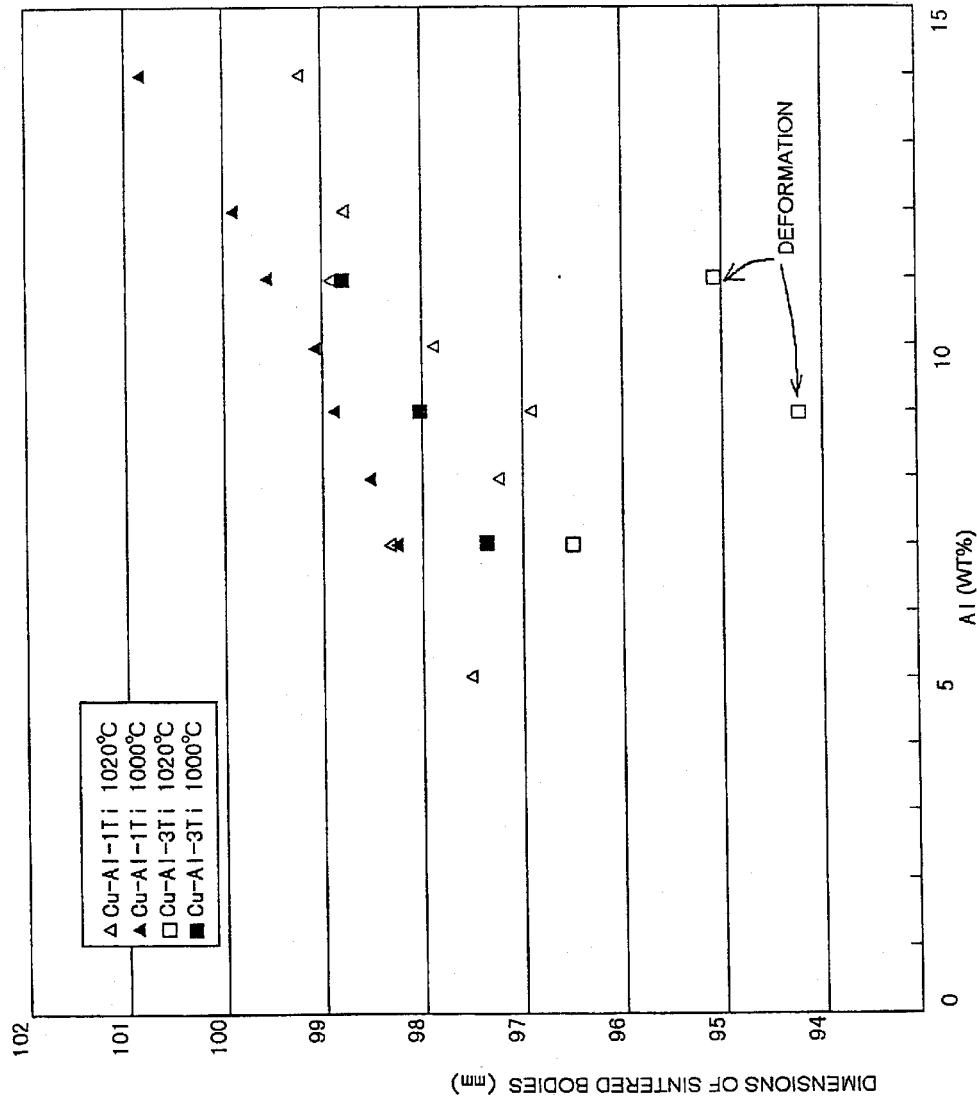
FIG. 4 graphically shows the effect of Ti upon the dimensions of Cu—Al sintered bodies.

TABLE 2 shows the dimensions of sintered bodies formed from Cu—Al to which TiH was added (Sample Nos. 18 to 20). FIG. 4 demonstrates the result of vacuum sintering at 1,000 degrees centigrade and 1,020 degrees centigrade. As apparent from the result, combustibility could be improved and no contraction occurred with the addition of Ti up to 3 wt % at a sintering temperature of 1,000 degrees centigrade. Noticeable contraction reaction (the deformation of samples and melting loss) was admitted in vacuum sintering (at 1,020 degrees centigrade) of samples to which 3 wt % Ti was added. This is due to the effect of sintering at the sintering temperatures just below the eutectic point shown in TABLE 2 or sintering in the ternary alloy eutectic region. Taking account of variations within the temperature of the vacuum furnace when mass production is carried out, the effect of Ti addition which enables sintering only within a limited temperature range is unsatisfactory as a sinter promoting element so that Ti needs to be added in combination with a liquid phase creating element such as Sn.

Figure 5:
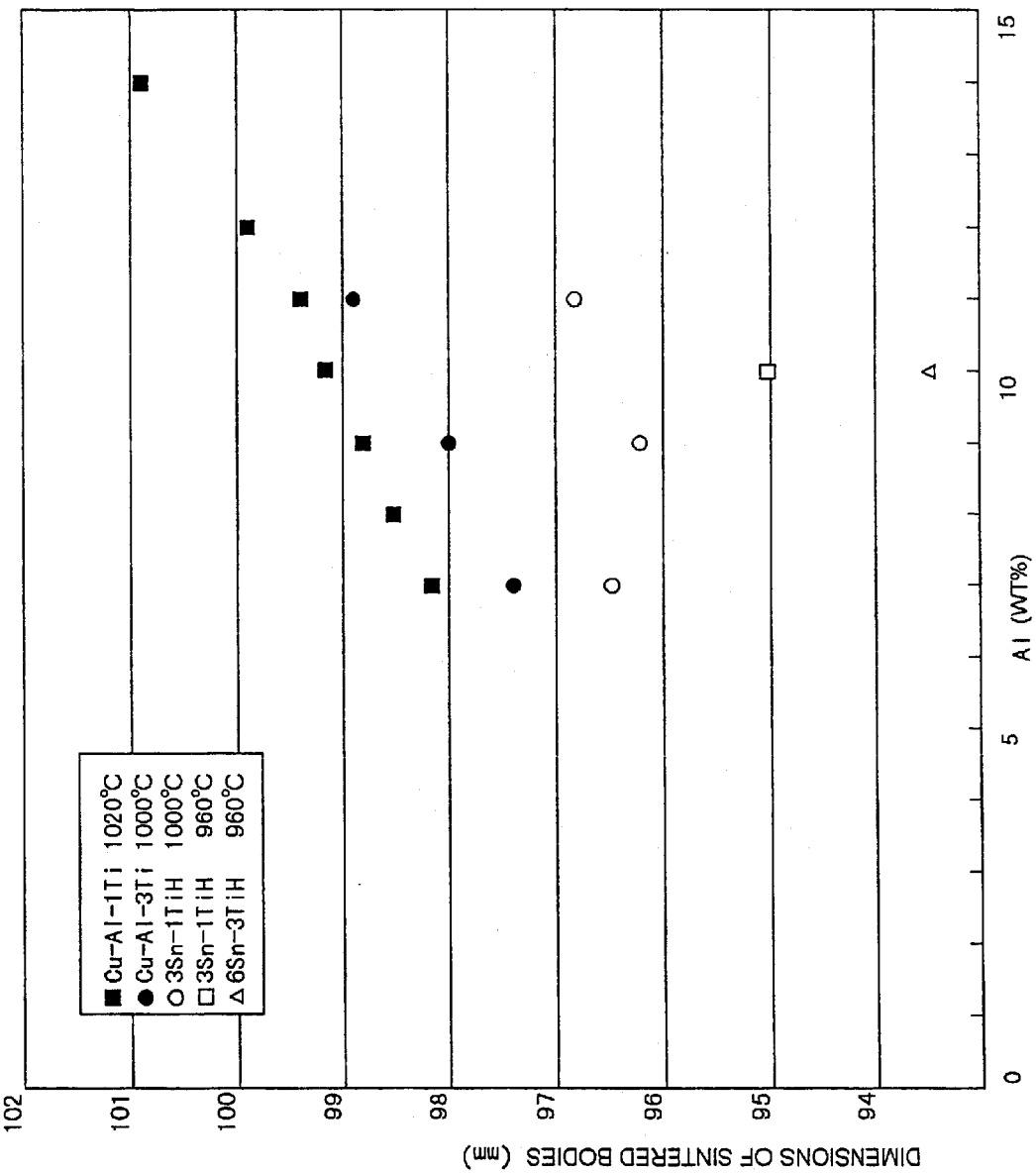
FIG. 5 graphically shows the effect of a combinational addition of Sn and Ti upon the dimensions of Cu—Al sintered bodies.

(3) The Effect of Combinational Addition of Sn and Ti Upon Cu—Al Based Sintered Material FIG. 5 demonstrates the dimensions of sintered bodies formed by sintering, at 960 to 1,000 degrees centigrade, Cu—Al to which Sn and TiH had been added in combination. In the case of the combinational addition, a more noticeable contraction reaction was observed than that of the cases where a single element of Sn or Ti was added to Cu—Al. The reason for this is that, in the cases of Sample Nos. 28 to 32, 36, 37, 41, 42, 46, 47, 51 and 52 in TABLE 2 for example, the sweating phenomenon observed in the Cu—Al—Sn ternary alloy based sintered bodies during vacuum-sintering at 1,000 degrees centigrade completely disappeared due to 1 to 3 wt % Ti added in combination with Sn so that the liquid phase created by the addition of Sn was not purged but effectively worked on the sintering reaction.

Figure 6:
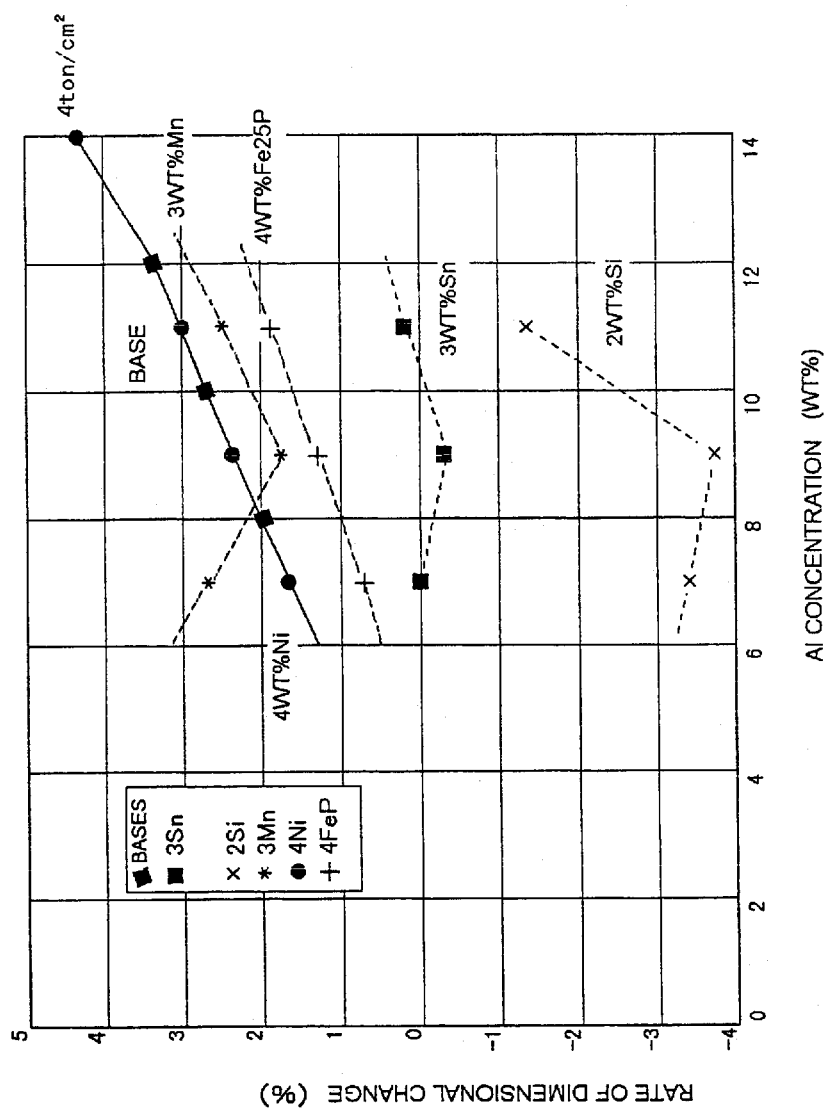
FIG. 6 graphically shows the effect of various alloy elements upon the dimensions of Cu—Al-1Ti sintered bodies.

(4) The Effects of Additions of Other Alloy Elements Upon Cu—Al Based Sintered Material FIG. 6 demonstrates the respective effects of additions of other alloy elements upon Cu—Al-1 wt % Ti formed by vacuum sintering at 1,000 degrees centigrade. From this figure, the above-described noticeable sinter promoting effect of Sn addition can be admitted. Also, the noticeable sinter promoting effect of Si addition can be confirmed. The above effects of Sn and Si are attributable to the following characteristics: (i) Al and Sn (Si) dissolve into each other when they are a liquid phase in the phase diagram but hardly dissolve when they are in a solid phase state; (ii) Al and Sn (Si) do not form intermetallic compounds together; and (iii) Sn (Si) considerably decreases in its melting point, reacting with Cu, to help the liquid phase generation.

The sinter promoting effect was clearly observed in Mn and phosphor iron (Fe25P) although it was not so noticeable. Further, an addition of phosphor iron made the gold color of sintered bodies more vivid and exhibited noticeable reduction action. An addition of Cu8P has the following effects. Cu8P has the sinter promoting effect less noticeable than that of P added in the form of phosphor iron so that the sintered bodies are easily expanded in the case of Cu8P. This is attributable to the fact that the sintered bodies formed by use of Cu8P have a number of minute pores. In addition, the eutectic temperature of Cu8P is as low as 714 degrees centigrade, because melt-off holes tend to be formed locally due to the liquid phase generated at the low temperature side in sintering.

EMBODIMENT 3

Figure 7:
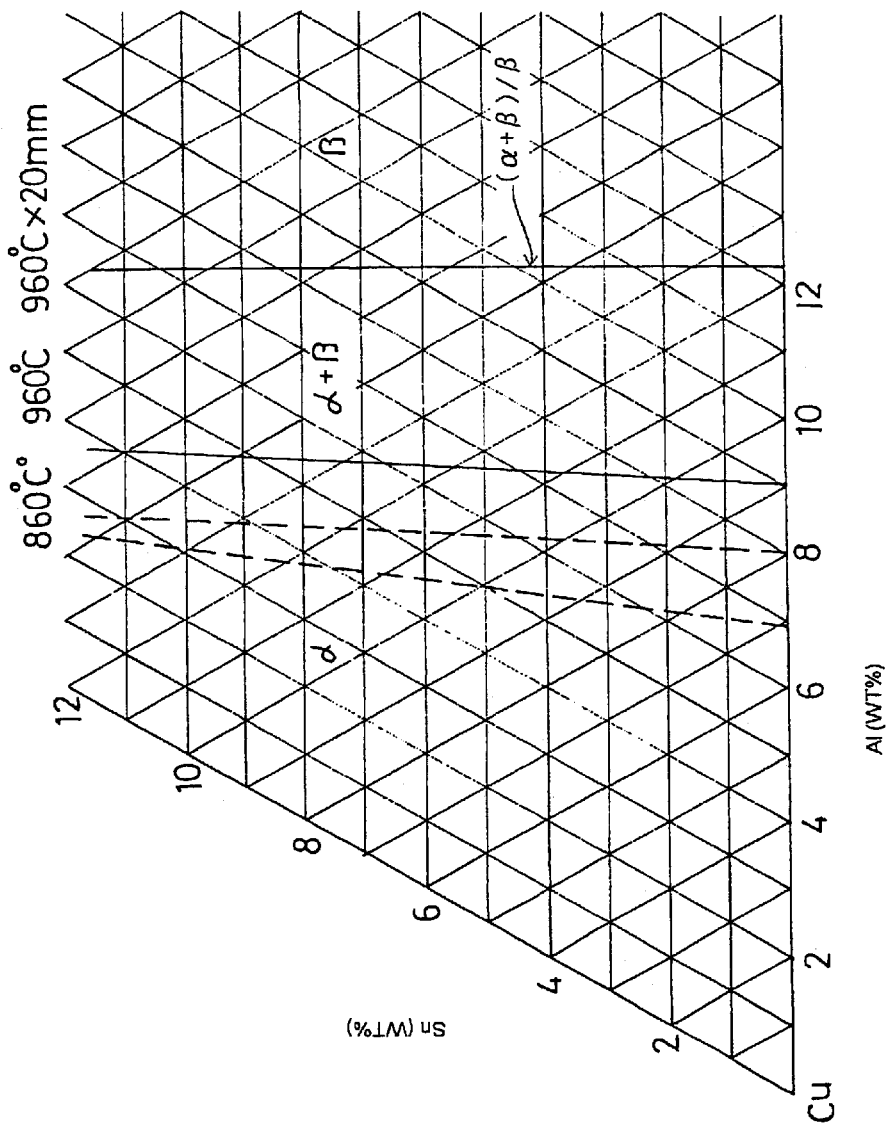
FIG. 7 graphically shows the regions where an alpha phase and/or a beta phase exists in Cu—Al—Sn sintered alloys.

The Effect of Sn Addition Upon the Emergence of an (alpha+beta) Dual Structure Region in Cu—Al TABLE 3 demonstrates the structures of the samples and the results of hardness measurements. The structures shown in TABLE 3 are associated with alpha and beta phases after vacuum sintering at an exemplary temperature of 1,000 degrees centigrade. FIG. 7 shows the respective regions in Cu—Al—Sn ternary alloy based materials where alpha and/or beta phase exists, based on observation of the structures of the materials sintered at temperatures of 1,000 to 820 degrees centigrade. As understood from the results, the (alpha+beta) dual phase region in Cu—Al binary alloys transited to the lower Al concentration side owing to an addition of Sn, and thus, Sn has proved to be an element which further stabilizes the beta phase. As indicated by broken line in FIG. 7, the presence of the beta phase was admitted in the lower Al concentration side when sintering was carried out at low temperatures. The reason for this is that the sintering did not reach an adequate equilibrium state. In the non-equilibrium state, the alpha/(alpha+beta) structure in which the beta phase starts to emerge and the (alpha+beta)/beta structure in which the alpha phase is disappeared and which transits to a single beta phase are represented by the following expression.

$$18.5 \leq 2.5 \times (\text{Al wt \%}) + (\text{Sn wt \%}) \leq 28.5$$

*the range of the (alpha+beta) dual phase region

TABLE 3

| | 1000° C. 20 min | | |
|---|---|---|---|
| No | DIMENSION | STRUCTURE | HARDNESS (Hv) |
| 1 | 98.1 | α + GRAIN BOUDARY β, DUPLEX GRAIN | 47 |
| 2 | 98.54 | α + GRAIN BOUDARY β, DUPLEX GRAIN | 48 |
| 3 | 98.81 | α + 10 β | 56 |
| 4 | 98.93 | α + 40 β | 67 |
| 5 | 98.56 | α + 70 β | 74 |

TABLE 3-continued

1000° C. 20 min

| No | DIMENSION | STRUCTURE | HARDNESS (Hv) |
|---|---|---|---|
| 6 | 92.46 | 100 β | 70 |
| 7 | 89.9 | β + COMPOUNDS | 118 |
| 8 | 94.48 | α | 30 |
| 9 | 93.3 | α + 3 COMPOUNDS | 34 |
| 10 | 91.27 | α + 5 COMPOUNDS | 42 |
| 11 | 88.09 | α + 5 β | 37 |
| 12 | 89.33 | α + 25 β | 45 |
| 13 | | | |
| 14 | | | |
| 15 | | | |
| 16 | | | |
| 17 | | | |
| 18 | 98.14 | α | 46 |
| 19 | 98.45 | α | 48 |
| 20 | 98.71 | α + LESS β | 45 |
| 21 | 99.09 | α + LESS β | 60 |
| 22 | 99.45 | α + β | 72 |
| 23 | 99.84 | β + LESS α | 81 |
| 24 | 100.8 | β + COMPOUNOS | 92 |
| 25 | 97.34 | α | 108 |
| 26 | 98.01 | α | 130 |
| 27 | 98.78 | α + β | 195 |
| 28 | 96.53 | β | 95 |
| 29 | 96.17 | α + β | 123 |
| 30 | 96.74 | β + α | 186 |
| 31 | 94.13 | α + 60 β, Ti-BASED COMPOUNDS | 185 |
| 32 | 92.29 | β 10 α | 203 |
| 33 | 93.21 | α + β, COMPOUNDS | 110 |
| 34 | 92.99 | α + β, COMPOUNDS | 170 |
| 35 | 95.24 | β PHASE, COMPOUNDS | 240 |
| 36 | 98.34 | β | 188 |
| 37 | 98.66 | α + Si COMPOUNDS | 223 |
| 38 | 99.15 | α + COMPOUNDS | 91 |
| 39 | 98.27 | α + β | 80 |
| 40 | 98.96 | β + α | 67 |
| 41 | 97.74 | α + 60 β | 130 |
| 42 | 98.06 | β | 176 |
| 43 | 98.12 | | 45 |
| 44 | 98.69 | | 48 |
| 45 | 99.44 | | 55 |
| 46 | 96.89 | α + 50 β | 151 |
| 47 | 97.37 | β + COMPOUNDS | 203 |
| 48 | 97.25 | α, IRON COMPOUNDS | 50 |
| 49 | 97.8 | α + LESS β, COMPOUNDS | 42 |
| 50 | 98.37 | α + β, COMPOUNDS | 65 |
| 51 | 96.76 | α + 50 β + FeP COMPOUNDS | 125 |
| 52 | 94.34 | β + FeP COMPOUNDS | 183 |
| 53 | 97.78 | α + β, COMPOUNDS | 111 |
| 54 | 98.15 | β, COMPOUNDS | 126 |
| CA7 | | | |
| CA8 | | | |
| CA9 | | | |

It will be understood from the hardness of the samples obtained after the sintering that the sintered materials become harder as the beta phase emerges and their hardness also considerably increases with additions of Ti, Si or the like. This is attributable to the precipitation of many intermetallic compounds.

The structure in the above-described non-equilibrium state becomes more significant with lower sintering temperature and shorter sintering time. However, in such sintering, the sintered body is markedly expanded and therefore sufficient strength cannot be achieved. Where compressing treatment such as described later (e.g., rolling) is applied in combination with sintering, strength sufficient to apply such treatment is necessary. More practically, sintering temperature should be 800 degrees centigrade or more, in view of the facts that rolling treatment can be applied at 820 degrees centigrade (the lowest sintering temperature of this embodiment) for 20 minutes according to the present embodiment and that Sn, which is an essential element of the invention, establishes firm bonding with respect to Cu at the peritectic temperature (798 degrees centigrade) of Cu—Sn alloys.

EMBODIMENT 4

Bonding to the Inner Circumferential Portion of a Part and Verification of Sliding Properties TABLE 4 shows the compositions of powder blends used in the present embodiment. B1 is for a contact component having an (alpha+beta) dual phase structure, and B2 and B3 are for contact components having a beta phase structure. Note that B3 was used for comparison in terms of the effect of phosphor iron upon the bonding to the inner circumferential portion of a part, and B4 was used for verifying the effect of a Cu—P oil retaining contact component containing 8 wt % P and utilizing melt-off holes. As comparative samples for the sliding test, four kinds of high strength brass materials were used. The composition of the materials is represented in wt % in the margin.

TABLE 4

| CODE | ELECTRIC COPPER | Al | Sn | TiH | Fe25P | Cu8P | BONDING RATIO (%) | STRUCTURE | HARDNESS (Hv) | OIL CONTENTS (cm$^3$) |
|---|---|---|---|---|---|---|---|---|---|---|
| B1 | Bal. | 10 | 3 | 3 | 1 | — | 99.3 | α + β | 165 | — |
| B2 | Bal. | 10 | 6 | 3 | 2 | — | 99.5 | β | 230 | — |
| B3 | Bal. | 10 | 6 | 3 | 0 | — | 92.1 | β | 235 | — |
| B4 | Bal. | 10 | 6 | 3 | 2 | 10 | 94.3 | β | 217 | 4.7 |

COMPARATIVE EXAMPLE HIGH-STRENGTH BRASS (Cu-25Zn-5Al-3Mn-2.5Fe)

The powder blends were respectively compacted, at a compaction pressure of 2 ton/cm$^2$, into cylindrical bodies having an outer diameter of 53 mm, inner diameter of 47 mm and height of 35 mm. Each cylindrical body was in turn placed in the inner circumferential portion of a steel pipe (S40C) having an outer diameter of 66 mm, inner diameter of 53 mm and height of 40 mm. Then, vacuum sintering was carried out for 20 minutes at temperatures of 990 degrees centigrade (for B1) and 960 degrees centigrade (for B2, B3 and B4). Then, each sintered body was cooled down using N$_2$ gas.

Figure 8:
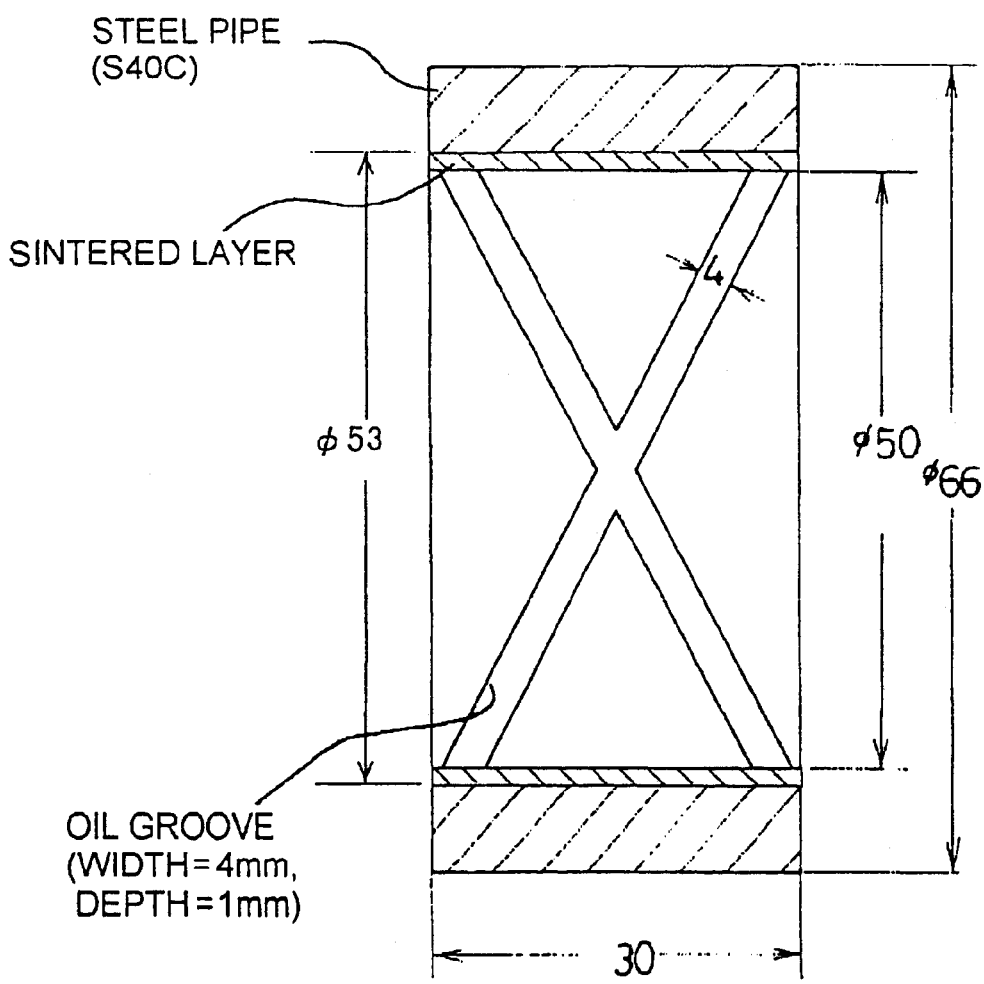
FIG. 8 is a sectional view showing the shape of a specimen used in a sliding test.
Figure 9:
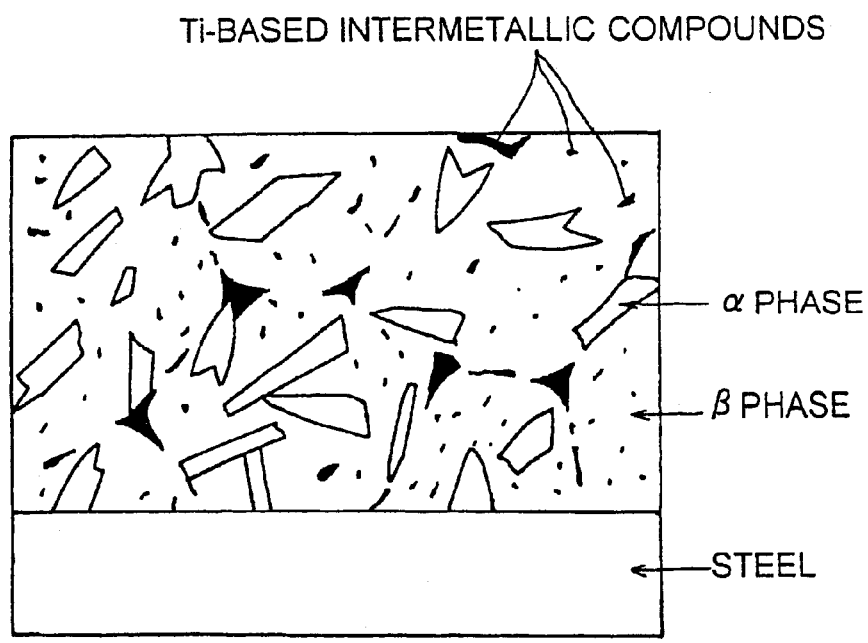
FIG. 9 is an exemplary view showing the structure of a portion of a steel pipe near its interface, the steel pipe having a sintered material B1 bonded to the inner circumferential portion thereof.

FIG. 8 shows the shape of samples (in the form of a bushing) used in a sliding test for checking the sintered bodies to be bonded to the inner circumferential portion of the steel pipe. The contact material B4 was tested without applying grooving treatment to the inner circumferential surface of the bushing. FIG. 9 is a schematic view showing the metal structure of the interface of the bonded part of B1 bonded to the inner circumferential portion of the steel pipe. As seen from this figure, B1 has a typical (alpha+beta) dual structure. The sintered layers of B1 and B2 are extremely hard, having vickers hardnesses of Hv=165 and Hv=230, respectively. TABLE 4 also shows the percentage of bonding between the steel pipe and the sintered layer of each component, the percentage being measured by an ultrasonic inspection instrument. As understood from the measured values, the percentage of bonding could be highly improved by the addition of phosphor iron. The amount of retained oil in B4 was about 4 to 5 cm$^3$. Accordingly, noticeable oil retention was admitted.

Figure 11:
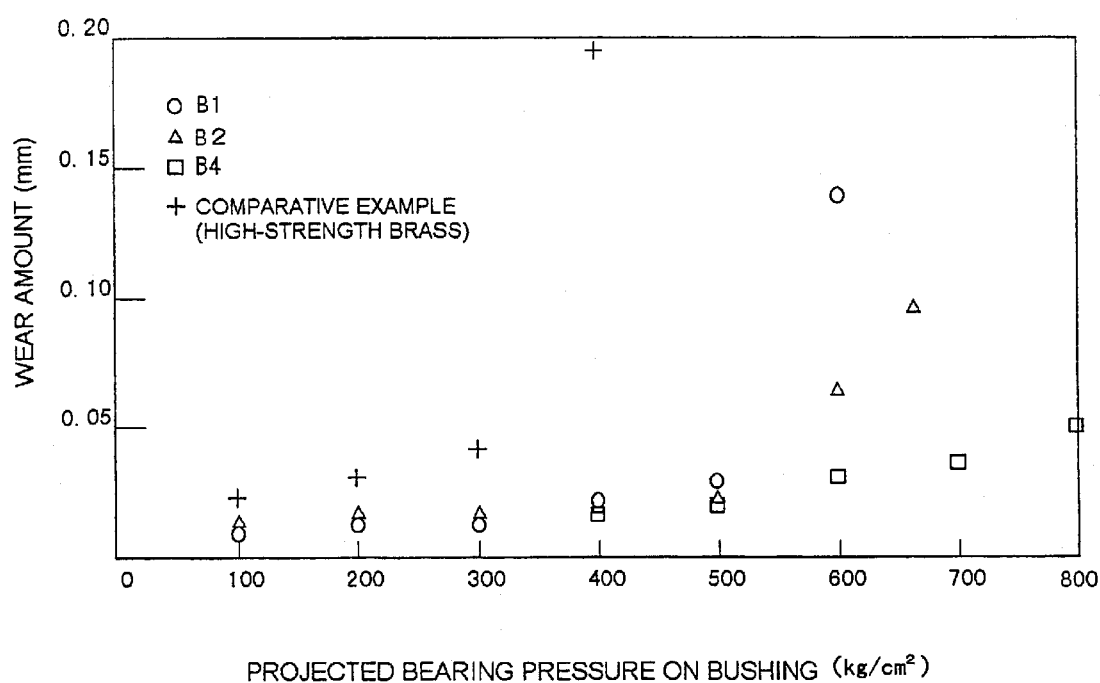
FIG. 11 graphically shows the result of a sliding test conducted on sintered bushings the inner circumferential portion of which has been subjected to bonding.

FIGS. 10(a) and 10(b) show a conceptual view of a sliding tester and test conditions, respectively. FIG. 11 shows the result of the sliding test. In the sliding test, each bushing sample was reciprocated 10,000 times for every projected area of 100 kg/cm$^2$ until 800 kg/cm$^2$ was reached, while bearing pressure being increased stepwise. The test was stopped at the point where the coefficient of friction had sharply increased due to seizure; where wear had been rapidly built up; or where abnormal noise had occurred.

As seen from FIG. 11, the inventive materials are superior to the high strength brass materials. The material B1 having the (alpha+beta) dual phase structure yielded a satisfactory result, that is, less wear at the initial stage and excellent seizure resistance. Although the average amount of wear occurring in the material B2 was greater than that of the material B1, the material B2 exhibited better wear resistance than the material B1.

EMBODIMENT 5

Preparation of Cu—Al—Sn-based Sintered Plates and Sliding Test

Sample Nos. 1 to 52 and the tensile test samples CA7, CA8 (sintered materials) shown in TABLE 2 were rolled to such an extent that they were not cracked and then sintered again at the same temperature for the same period of time for hardness measurement. Thereafter, these rolled, re-sintered materials (2S1R materials) were subjected to a constant-rate friction/wear test in which the pressure and speed at which the coefficient of friction of each sample started to steeply increase were checked, and based on the pressure and speed, the limitation of seizure (PV value) and the amount of wear (Δ W) at the point where the limitation of seizure was reached were measured for evaluation.

FIGS. 12(a) and 12(b) show a conceptual view of a constant-rate friction/wear tester and a perspective view of a sliding tester holder, respectively. The conditions of the sliding test are as follows.

Sliding Test Conditions

Mating member: SCM420 carburized and quenched
surface hardness=H$_{RC}$ 60 to 62
surface roughness=2.5S or less
Lubricant: EO10,
the amount of oil=250 cm$^3$/minute
oil temperature=60 degrees centigrade
Peripheral speed=10 m/second
Bearing pressure=800 kg/cm$^2$ max. (bearing pressure is stepwise increased by 50 kg/cm$^2$ at a time)

Each sliding test sample was machined so as to have a thickness of 2 mm, a width of 5 mm and a length of 5 mm and then placed in the sliding test holder for testing. In the sliding test, bearing pressure started from 100 kg/cm$^2$ and was stepwise raised by 50 kg/cm$^2$ for every 5 minutes until it reached 800 kg/cm$^2$, unless abnormal coefficient of friction or abnormal wear arose.

The vickers hardness (Hv), PV value and wear amount of each sample are shown together in TABLE 5. The following facts were found from this result.

(1) The addition of Sn to Cu—Al gave virtually no effect of increasing hardness. As the concentration of Al increased, hardness slightly increased. In the case of the material having the beta single phase structure, rolling was difficult to carry out which resulted in poor hardness.

(2) The addition of Ti had the noticeable effect of increasing the hardness of Cu—Al based sintered bodies and Cu—Al—Sn based sintered bodies. This effect increased with increases in sintering temperature, because Ti functioned to promote alloying. The same alloying promoting function could be observed in the cases of Mn, Ni and Si.

(3) The sliding properties of each sample were evaluated by a constant-rate friction/wear test and it was found from the result that the sliding properties of the alpha phase materials, (alpha+beta) dual phase materials and beta phase materials could be improved by the additions of Sn.

(4) The sliding properties of the (alpha+beta) dual phase materials and beta phase materials proved to be considerably improved, compared to the hard, alpha phase materials.

(5) The additions of Ti, Si, Mn and Ni proved to increase wear resistance.

The test result of the samples CA7 and CA8 shown in TABLE 5 is based on the following conditions: the time taken for vacuum sintering at 900 degrees centigrade was shortened to 5 minutes and rolling and sintering were done twice (3S2R materials). It was verified that, in the case of CA8, the beta phase constituents in a non-equilibrium state finely precipitated along the grain boundary, which gave the effect of improving the sliding properties of CA8.

TABLE 5

| No | Cu (CE) | Al | Sn | Ti | Si | Mn | Ni | Fe27P | Cu8P | 2S1R (900) Hv | 2S1R (960) Hv | 2S1R (850) Hv | PV VALUE | WEAR AMOUNT (mm) | SINTERING TEMPERATURE (° C.) | STRUCTURE |
|---|---|---|---|---|---|---|---|---|---|---|---|---|---|---|---|---|
| 1 | Bal. | 7 | 0 | | | | | | | 72 | 81 | 79 | 2500 | 0.24 | 900 | α |
| 2 | Bal. | 9 | 0 | | | | | | | 84 | 103 | 89 | | | | |
| 3 | Bal. | 10 | 0 | | | | | | | 85 | 93 | 94 | 4000 | 0.16 | 900 | α + β |
| 4 | Bal. | 11 | 0 | | | | | | | 82 | 99 | 105 | | | | |
| 5 | Bal. | 10 | 3 | | | | | | | 67 | 80 | 77 | 7000 | 0.11 | 900 | α + β |
| 6 | Bal. | 10 | 6 | | | | | | | 76 | 72 | 75 | 8000 | 0.08 | 900 | β |
| 7 | Bal. | 10 | 9 | | | | | | | 63 | | 70 | | | | |
| 8 | Bal. | 4 | 6 | | | | | | | 73 | | 72 | 4500 | 0.12 | 900 | α |
| 9 | Bal. | 5 | 6 | | | | | | | 57 | | 73 | | | | |
| 10 | Bal. | 6 | 6 | | | | | | | 73 | | 69 | 5500 | 0.09 | 900 | α + β |
| 11 | Bal. | 7 | 6 | | | | | | | 65 | 80 | 75 | | | | |
| 12 | Bal. | 8 | 6 | | | | | | | 78 | 82 | 79 | 8000 | 0.07 | 900 | α + β |
| 13 | Bal. | 2 | 11 | | | | | | | 52 | | 80 | | | | |
| 14 | Bal. | 3 | 11 | | | | | | | | | 81 | | | | |
| 15 | Bal. | 4 | 11 | | | | | | | | | 58 | 4500 | 0.21 | 850 | α |
| 16 | Bal. | 5 | 11 | | | | | | | | | 62 | 8000 | 0.09 | 850 | α + β |
| 17 | Bal. | 6 | 11 | | | | | | | 77 | | 64 | 7500 | 0.06 | 850 | α + β |
| 18 | Bal. | 7 | | 1 | | | | | | 147 | | | 3500 | 0.19 | 900 | α |
| 19 | Bal. | 8 | | 1 | | | | | | 151 | | | | | | |
| 20 | Bal. | 9 | | 1 | | | | | | 161 | | | | | | |
| 21 | Bal. | 10 | | 1 | | | | | | 168 | | | 4000 | 0.07 | 900 | α + β |
| 22 | Bal. | 11 | | 1 | | | | | | 162 | | | | | | |
| 23 | Bal. | 12 | | 1 | | | | | | 136 | | | | | | |
| 24 | Bal. | 14 | | 1 | | | | | | 108 | | | | | | |
| 25 | Bal. | 7 | 3 | | | | | | | 136 | | | | | | |
| 26 | Bal. | 9 | 3 | | | | | | | 147 | | | | | | |
| 27 | Bal. | 11 | 3 | | | | | | | 165 | | | | | | |
| 28 | Bal. | 7 | 3 | 1 | | | | | | 162 | | | | | | |
| 29 | Bal. | 9 | 3 | 1 | | | | | | 155 | | | 6500 | 0.04 | 900 | α + β |
| 30 | Bal. | 11 | 3 | 1 | | | | | | 134 | | | | | | |
| 31 | Bal. | 10 | 3 | 3 | | | | | | 138 | 193 | 146 | 7500 | 0.02 | 900 | α + β |
| 32 | Bal. | 10 | 6 | 3 | | | | | | 89 | 188 | 96 | 6500 | 0.03 | 900 | β |
| 33 | Bal. | 7 | | 1 | 2 | | | | | 110 | | | | | | |
| 34 | Bal. | 9 | | 1 | 2 | | | | | 117 | | | | | | |
| 35 | Bal. | 11 | | 1 | 2 | | | | | 103 | | | | | | |
| 36 | Bal. | 10 | 3 | 1 | 1 | | | | | 82 | 124 | 106 | 8000 | 0.03 | 900 | α + β |
| 37 | Bal. | 10 | 6 | 1 | 1 | | | | | 103 | 192 | 67 | 7000 | 0.04 | 900 | β |
| 38 | Bal. | 7 | | 1 | 3 | | | | | 155 | | | | | | |
| 39 | Bal. | 9 | | 1 | 3 | | | | | 157 | | | | | | |
| 40 | Bal. | 11 | | 1 | 3 | | | | | 158 | | | | | | |
| 41 | Bal. | 10 | 3 | 1 | 3 | | | | | 136 | 159 | 132 | 7500 | 0.02 | 960 | α + β |
| 42 | Bal. | 10 | 6 | 1 | 3 | | | | | 121 | 162 | 103 | 6500 | 0.02 | 960 | β |
| 43 | Bal. | 7 | | 1 | | 4 | | | | 147 | | | | | | |
| 44 | Bal. | 9 | | 1 | | 4 | | | | 135 | | | | | | |
| 45 | Bal. | 11 | | 1 | | 4 | | | | 138 | | | | | | |
| 46 | Bal. | 10 | 3 | 1 | | 3 | | | | 115 | 155 | 136 | 8000 | 0.01 | 960 | α + β |
| 47 | Bal. | 10 | 6 | 1 | | 3 | | | | 88 | 164 | 88 | 7000 | 0.03 | 960 | β |
| 48 | Bal. | 7 | | 1 | | | 4 | | | 80 | | | | | | α |
| 49 | Bal. | 9 | | 1 | | | 4 | | | 73 | | | | | | |
| 50 | Bal. | 11 | | 1 | | | 4 | | | 73 | | | | | | |
| 51 | Bal. | 10 | 3 | 1 | | | 3 | | | 79 | 79 | 69 | 7000 | 0.02 | 960 | α + β |
| 52 | Bal. | 10 | 6 | 1 | | | 3 | | | 82 | 113 | 61 | 6500 | 0.04 | 960 | β |
| CA7 | Bal. | 5 | 0 | 1 | | | | | | 150 | | | 4500 | 0.08 | 900.5min | α |
| CA8 | Bal. | 5 | 3 | 1 | | | | | | 169 | 3S2R | | 6500 | 0.02 | 900.5min | α + β |

EMBODIMENT 6

Preparation of a Composite Component in Which a Material is Sinter-bonded to a Steel Plate and Sliding Test In this embodiment, a bronze atomized powder (Cu-20 wt % Sn), copper atomized powder, Cu—Al atomized powder containing 20.2 wt % Al, Cu—Al atomized powder containing 50.5 wt % Al, and the powders employed in Embodiment 1 were used to prepare the powder blends shown in TABLE 6. Note that these bronze, copper and Cu—Al atomized powders had a grain size of 250 meshes or less. For a sinter-bonding test, each powder blend was sinter-bonded to a soft steel plate (SS400, thickness=3.5 mm, width=90 mm, length=300 mm) which had been coarsened at its surface by an abrasive paper No. 400 and well washed with acetone.

degrees centigrade in the furnace atmosphere of ammonia cracked gas having the same dew point. Thereafter, the powder blends PB7 to PB10 shown in TABLE 6 were further sprayed onto the steel plates respectively to form a layer of 2 mm in height. Then, each steel plate was rolled by the roller such that the entire sintered layer had a thickness of 2.0 mm. Sintering was carried out at 900 degrees centigrade for 10 minutes similarly to the above case and compression by rolling was again carried out so that the entire sintered layer was 2.0 mm in thickness. Thereafter, sintering at 900 degrees centigrade was again done in order to remove distortion caused by rolling and sequentially, rounding-bending was carried out. As a result of checking the peeling condition of the sintered layer of each sample, the samples having the interposed third sintered layer proved to have no problem. While a bronze sintered material was used as the third sintered layer in the present embodiment, it is apparent that iron-based sintered materials such as Fe-30Cu-5Sn can be used.

TABLE 6

| CODE | ATOMIZED (° C.) | ELECTRIC COPPER | Cu20Sn | Sn | Al | Au20Al | Cu50Al | TiH | ROLLING | BENDING INTO ROUND SHAPE | STRUCTURE | SINTERING TEMPERATURE (° C.) |
|---|---|---|---|---|---|---|---|---|---|---|---|---|
| PB1 | Bal. | | 35 | 3 | 5 | | | 0.3 | REELING | | | 900 |
| PB2 | Bal. | | 35 | 3 | | 25 | | 0.3 | ○ | ○ | α + β | 900 |
| PB3 | Bal. | | 35 | 3 | | | 10 | 0.3 | REELING | | | 900 |
| PB4 | Bal. | | 35 | 3 | | 15 | | | ○ | ○ | α + β | 900 |
| PB5 | Bal. | | 35 | 3 | | 20 | | | ○ | ○ | α + β | 900 |
| PB6 | Bal. | | 35 | 3 | | 40 | | | CRACKING | REELING | β | 900 |
| PB7 | | Bal. | 12 | 3 | 6 | | | 0.5 | ○ | ○ | α + β | 980 |
| PB8 | | Bal. | 12 | 3 | 8 | | | 0.5 | ○ | ○ | α + β | 980 |
| PB9 | | Bal. | 12 | 3 | | 30 | | 0.5 | ○ | ○ | α + β | 980 |
| PB10 | | Bal. | 12 | 3 | | 40 | | 0.5 | ○ | ○ | α + β | 980 |

(1) Direct Spraying to a Steel Plate and Sinter Bonding Test

Each of the powder blends PB1 to PB6 shown in TABLE 6 was sprayed onto the steel plate to form a layer of 3 mm in height. Then, a graphite plate having a thickness of 3 mm was overlaid and sinter-bonding was carried out by heating at 900 degrees centigrade for 10 minutes in a furnace having an atmosphere of ammonia cracked gas (dew point=−38 degrees centigrade). Subsequently, rolling was carried out with a roller such that the resulting sintered layer had a thickness of 1.7 mm. As a result, where pure Al or Cu-50Al was used as an Al source, strength enough to withstand rolling could not be obtained. The rolled bodies, in which PB2 and PB4 to PB6 had been sprayed respectively, were subjected to sintering again under the same condition as described earlier and then processed by bending into a cylindrical form having a diameter of 95 mm with the sintered layer inside. The condition of the sintered layer of each sample was checked as to whether or not it was peeled from the steel plate. It was found from the observation that, in the case of PB6, minute cracks which had been created during the rolling developed, resulting in peeling because PB6 had a beta phase.

(2) Test in Which Sinter-bonding is Carried Out With an Interposed Third Sintered Layer A powder blend was prepared by adding 3 et % Sn atomized powder to a Cu—Sn-alloy atomized powder containing 10 wt % Sn and having a grain size of 250 meshes. This powder blend was sprayed onto steel plates such that a layer of about 1 mm in height was formed on each of the steel plates and then, each steel plate was heated at 900

(3) Evaluation of Sliding Properties

Figure 13:
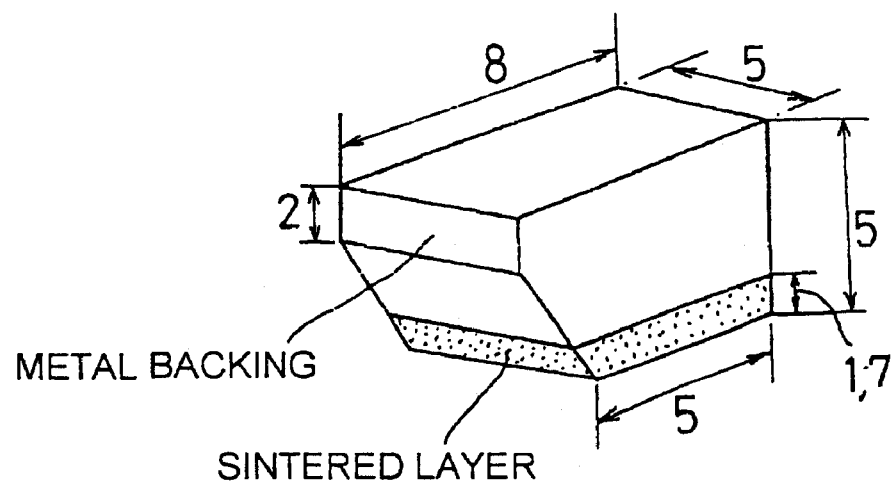
FIG. 13 is a perspective view showing the shape of a specimen for use in a constant-rate friction/wear test.

The sliding properties of each sample was evaluated, using a constant-rate friction/wear tester. The same system and testing conditions as employed in Embodiment 5 were adapted. FIG. 13 shows the shape of the sliding test samples. As a comparative example, a Cu—Sn—Pb lead bronze sintered material (LBC), which contained 10 wt % Sn and 10 wt % Pb and was sinter-bonded to a steel plate, was used.

For verifying tenacity, PB2 and PB10 were evaluated in terms of the reproducibility of the PV value of N=5. As seen from FIG. 14, PB2 and PB10 exhibited reproducibility similar to that of The comparative example and better average PV values than the lead bronze sintered material, while their wear resistance proved to be remarkably improved.

What is claimed is:

1. A Cu—Al based sintered material containing at least 1 to 12 wt % Sn and 2 to 14 wt % Al, and which has a structure in which a beta phase is present at least within a sintered structure and intermetallic compounds are dispersed within an (alpha+beta) dual phase, the beta phase and/or the bases of the [alpha+beta] dual phase and the beta phase, and
   wherein the relationship between the percentage of Al by weight and the percentage of Sn by weight is represented by:

$$18.5 \leq 2.5 \times (\text{Al wt \%}) + (\text{Sn wt \%}).$$

2. A Cu-Al based sintered material containing at least 1 to 12 wt % Sn and 2 to 14 wt % Al, which contains one or more of Ti within the range of 0.3 to 5 wt % and Si within the range of 0.5 to 3 wt %.

3. The sintered material as set forth in claim 2, which has a structure in which a beta phase is present at least within a sintered structure and intermetallic compounds are dispersed within an (alpha+beta) dual phase, the beta phase and/or the bases of the (alpha+beta) dual phase and the beta phase.

4. The sintered material as set forth in claim 3, which contains at least one of the elements Mn, Ni and Fe in an amount of 5 wt % or less, these elements stabilizing the beta phase, retarding the eutectoid transformation of beta=alpha+ gamma, and imparting hardness.

5. The sintered material as set forth in claim 2, which contains 2 wt % or less of P in the form of phosphor-iron alloy powder, P increasing reducibility in sintering.

6. A Cu—Al based sintered material containing at least 1 to 12 wt % Sn and 2 to 14 wt % Al, which further contains one or more alloy elements selected from the group consisting of P, Zn, Fe, Ni Co, Mn, Be, Pb, Mo, W, Mg and Ag and/or one or more of the dispersion elements WC, graphite and ceramics.

7. The sintered material as set forth in any one of claims 1 to 6, which is for use in sliding parts.

8. A composite sintered contact component formed by integrally sinter-bonding a Cu—Al—Sn based sintered material to a metal backing, the Cu—Al—Sn based sintered material containing at least 1 to 12 wt % Sn and 2 to 14 wt % Al.

9. The composite sintered contact component as set forth in claim 8, which contains one or more of Ti within the range of 0.3 to 5 wt % and Si within the range of 0.5 to 3 wt %.

10. The composite sintered contact component as set forth in claim 8 or 9, which has a structure in which a beta phase is present at least within a sintered structure and intermetallic compounds are dispersed within an (alpha+beta) dual phase, the beta phase and/or the bases of the (alpha+beta) dual phase and the beta phase.

11. The composite sintered contact component as set forth in claim 10, which contains at least one of the elements Mn, Ni and Fe in an amount of 5 wt % or less, these elements stabilizing the beta phase, retarding the eutectoid transformation of beta=alpha+gamma, and imparting hardness.

12. The composite sintered contact component as set forth in claim 8, which contains 2 wt % or less of P in the form of phosphor-iron alloy powder, P increasing reducibility in sintering.

13. The composite sintered contact component as set forth in claim 12, which contains one or more alloy elements selected from the group consisting of P, Zn, Fe, Ni, Co, Mn, Be, Pb, Mo, W, Mg and Ag and/or one or more of the dispersion elements WC, graphite and ceramics.

14. The composite sintered contact component as set forth in claim 8, which is formed by compressing a powder blend containing 2 to 14 wt % Al added in the form of Cu—Al based alloy powder or Al powder to form a desired cylindrical green compact; inserting the green compact into a metal backing having a bore slightly larger than the outer diameter of the green compact; and sinter-bonding the green compact to the inner circumferential portion of the metal backing at 800 degrees centigrade or more within a sintering furnace controlled to have a vacuum, neutral or reduced atmosphere.

15. The composite sintered contact component as set forth in claim 14, in which the sinter-bonding of the green compact to the inner circumferential portion of the metal backing is carried out with a third metal alloy interposed between the metal backing and the green compact.

16. The composite sintered contact component as set forth in claim 15, wherein the third metal alloy consists of an ingot alloy and/or sintered alloy which create a liquid phase necessary for the bonding to the metal backing at at least a sinter-bonding temperature.

17. The composite sintered contact component as set forth in claim 14 or 15, wherein the inner circumferential portion of the metal backing is grooved such that the groove becomes an oil pool for lubricants after sinter bonding.

18. The composite sintered contact component as set forth in claim 8, wherein the metal backing consists of steel.

19. The composite sintered contact component as set forth in any one of claim 8, 9, 12, and 13, which is formed in such a way that a bronzed-based, Cu—Sn alloy powder or powder blend containing 5 to 12 wt % Sn is sprayed onto a steel plate; the alloy powder or powder blend is then sinter-bonded to the steel plate at 700 degrees centigrade or more in a sintering furnace controlled to have a vacuum, neutral or reduced atmosphere to form a metal backing; the Cu—Al and/or Cu—Al—Sn based alloy powder having an Al concentration of 2 to 14 wt % is sprayed onto the metal backing; and then, the steps of (i) sintering and rolling at 700 degrees centigrade or more, (ii) sintering or rolling at 700 degrees centigrade or more, and (iii) sintering at 700 degrees centigrade or more are carried out.

20. The composite sintered contact component as set forth in claim 19, wherein each of the steps of (i) sintering and rolling at 700 degrees centigrade or more, (ii) sintering or rolling at 700 degrees centigrade or more, and (iii) sintering at 700 degrees centigrade or more is repeated twice or more, whereby the Cu—Al and/or Cu—Al—Sn based sintered contact layer is fined so as to have an average grain size of 5 $\mu$ or less, while being compacted so as to have a relative density of 90% or more.

21. The composite sintered contact component as set forth in claim 20, which has an increased hardness of Hv 100 or more and improved wear resistance.

22. The composite sintered contact component as set forth in claim 10, which is formed in such a way that a bronzed-based, Cu—Sn alloy powder or powder blend containing 5 to 12 wt % Sn is sprayed onto a steel plate; the alloy powder or powder blend is then sinter-bonded to the steel plate at 700 degrees centigrade or more in a sintering furnace controlled to have a vacuum, neutral or reduced atmosphere to form a metal backing; the Cu—Al and/or Cu—Al—Sn based alloy powder having an Al concentration of 2 to 14 wt % is sprayed onto the metal backing; and then, the steps of (i) sintering and rolling at 700 degrees centigrade or more, (ii) sintering or rolling at 700 degrees centigrade or more, and (iii) sintering at 700 degrees centigrade or more are carried out.

23. The composite sintered contact component as set forth in claim 11, which is formed in such a way that a bronzed-based, Cu—Sn alloy powder or powder blend containing 5 to 12 wt % Sn is sprayed onto a steel plate; the alloy powder or powder blend is then sinter-bonded to the steel plate at 700 degrees centigrade or more in a sintering furnace controlled to have a vacuum, neutral or reduced atmosphere to form a metal backing; the Cu—Al and/or Cu—Al—Sn based alloy powder having an Al concentration of 2 to 14 wt % is sprayed onto the metal backing; and then, the steps of (i) sintering and rolling at 700 degrees centigrade or more, (ii) sintering or rolling at 700 degrees centigrade or more, and (iii) sintering at 700 degrees centigrade or more are carried out.

24. The composite sintered contact component as set forth in claim 22, wherein the steps of (i) sintering and rolling at 700 degrees centigrade or more, (ii) sintering or rolling at 700 degrees centigrade or more, and (iii) sintering at 700 degrees centigrade or more are repeated twice or more, whereby the Cu—Al and/or Cu—Al—Sn based sintered contact layer is fined so as to have an average grain size of 5 μor less, while being compacted so as to have a relative density of 90% or more.

25. The composite sintered contact component as set forth in claim 23, wherein the steps of (i) sintering and rolling at 700 degrees centigrade or more, (ii) sintering or rolling at 700 degrees centigrade or more, and (iii) sintering at 700 degrees centigrade or more are repeated twice or more, whereby the Cu—Al and/or Cu—Al—Sn based sintered contact layer is fined so as to have an average grain size of 5 μor less, while being compacted so as to have a relative density of 90% or more.

26. The composite sintered contact component as set forth in claim 24, which has an increasing hardness of HV 100 or more and improved wear resistance.

27. The composite sintered contact component as set forth in claim 15, which has an increasing hardness of Hv 100 or more and improved wear resistance.

* * * * *

UNITED STATES PATENT AND TRADEMARK OFFICE
CERTIFICATE OF CORRECTION

PATENT NO. : 6,613,121 B2 Page 1 of 1
DATED : September 2, 2003
INVENTOR(S) : Takemori Takayama et al.

It is certified that error appears in the above-identified patent and that said Letters Patent is hereby corrected as shown below:

<u>Column 30,</u>
Line 56, "[alpha+beta)" should read -- (alpha+beta) --.

Signed and Sealed this

Eleventh Day of May, 2004

JON W. DUDAS
*Acting Director of the United States Patent and Trademark Office*